(12) United States Patent
Wei et al.

(10) Patent No.: US 9,510,208 B2
(45) Date of Patent: Nov. 29, 2016

(54) SEQUENCE GENERATION FOR SHARED SPECTRUM

(71) Applicant: QUALCOMM Incorporated, San Diego, CA (US)

(72) Inventors: Yongbin Wei, San Diego, CA (US); Wanshi Chen, San Diego, CA (US); Tao Luo, San Diego, CA (US); Peter Gaal, San Diego, CA (US); Hao Xu, San Diego, CA (US); Tingfang Ji, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 14/490,154

(22) Filed: Sep. 18, 2014

(65) Prior Publication Data
US 2015/0098349 A1    Apr. 9, 2015

Related U.S. Application Data

(60) Provisional application No. 61/887,034, filed on Oct. 4, 2013.

(51) Int. Cl.
*G01R 31/08* (2006.01)
*H04W 16/14* (2009.01)
(Continued)

(52) U.S. Cl.
CPC ............. *H04W 16/14* (2013.01); *H04W 24/00* (2013.01); *H04W 24/08* (2013.01); *H04L 1/0026* (2013.01); *H04W 48/16* (2013.01); *H04W 74/0808* (2013.01)

(58) Field of Classification Search
CPC ... H04W 16/14; H04W 24/08; H04W 24/00; H04W 74/0808; H04W 48/16; H04L 1/0026
See application file for complete search history.

(56) References Cited

U.S. PATENT DOCUMENTS

| 7,324,544 B1 * | 1/2008 | Gubbi | H04L 1/16 370/442 |
| 2003/0016647 A1 * | 1/2003 | Margon | H04L 12/4013 370/342 |

(Continued)

FOREIGN PATENT DOCUMENTS

| WO | WO2010/145779 | * 12/2010 |
| WO | WO-2010145779 A1 | 12/2010 |

(Continued)

OTHER PUBLICATIONS

ISA/EPO, Partial International Search Report of the International Searching Authority, Int'l App. No. PCT/US2014/056432, Jan. 16, 2015, European Patent Office, Rijswijk, NL, 5 pgs.
(Continued)

*Primary Examiner* — Robert Wilson
(74) *Attorney, Agent, or Firm* — Holland & Hart LLP

(57) ABSTRACT

Methods, systems, apparatuses, and devices are described for wireless communication. In one example, a sequence may be determined based on at least one of: an operator identifier associated with an operator using a spectrum or a clear channel assessment (CCA) slot index associated with the operator using the spectrum. At least one channel based on the determined sequence may be used to communicate over the spectrum.

28 Claims, 17 Drawing Sheets

(51) Int. Cl.
*H04W 24/08* (2009.01)
*H04W 24/00* (2009.01)
*H04L 1/00* (2006.01)
*H04W 74/08* (2009.01)
*H04W 48/16* (2009.01)

(56) References Cited

U.S. PATENT DOCUMENTS

| | | | | |
|---|---|---|---|---|
| 2005/0117540 | A1* | 6/2005 | Kuchibhotla | H04W 76/021 370/329 |
| 2009/0047960 | A1* | 2/2009 | Gunnarsson | H04J 11/0093 455/436 |
| 2010/0254259 | A1* | 10/2010 | Singh | G06F 11/1443 370/225 |
| 2011/0013530 | A1* | 1/2011 | Rinne | H04J 11/0069 370/252 |
| 2012/0149431 | A1* | 6/2012 | Bakker | H04W 24/10 455/525 |
| 2013/0107835 | A1* | 5/2013 | Aiba | H04L 5/0007 370/329 |
| 2014/0024375 | A1* | 1/2014 | Fitzpatrick | H04W 36/30 455/436 |
| 2014/0287726 | A1 | 9/2014 | Jang et al. | |
| 2015/0002758 | A1* | 1/2015 | Chu | G06F 3/041 349/12 |
| 2015/0098349 | A1* | 4/2015 | Wei | H04W 16/14 370/252 |
| 2015/0117369 | A1* | 4/2015 | Merlin | H04W 72/0446 370/329 |
| 2015/0245327 | A1* | 8/2015 | Damnjanovic | H04W 16/14 370/336 |

FOREIGN PATENT DOCUMENTS

| | | |
|---|---|---|
| WO | WO-2013105786 A1 | 7/2013 |
| WO | WO-2013131257 A1 | 9/2013 |

OTHER PUBLICATIONS

ISA/EPO International Search Report and Written Opinion of the International Searching Authority, Int'l App. No. PCT/US2014/056432, May 29, 2015, European Patent Office, Rijswijk, NL, 13 pgs.

* cited by examiner

SEQUENCE GENERATION FOR SHARED SPECTRUM

CROSS REFERENCES

The present application for patent claims priority to U.S. Provisional Patent Application No. 61/887,034, by Wei et al., entitled "SEQUENCE GENERATION FOR SHARED SPECTRUM," filed Oct. 4, 2013, assigned to the assignee hereof, and expressly incorporated by reference herein.

BACKGROUND

Wireless communications networks are widely deployed to provide various communication services such as voice, video, packet data, messaging, broadcast, and the like. These wireless networks may be multiple-access networks capable of supporting multiple users by sharing the available network resources.

A wireless communications network may include a number of access points. The access points of a cellular network may include a number of base stations, such as NodeBs (NBs) or evolved NodeBs (eNBs). The access points of a wireless local area network (WLAN) may include a number of WLAN access points, such as WiFi nodes. Each access point may support communication for a number of user equipments (UEs) and may often communicate with multiple UEs at the same time. Similarly, each UE may communicate with a number of access points, and may sometimes communicate with multiple access points and/or access points employing different access technologies. An access point may communicate with a UE via downlink and uplink. The downlink (or forward link) refers to the communication link from the access point to the UE, and the uplink (or reverse link) refers to the communication link from the UE to the access point.

As cellular networks become more congested, operators are beginning to look at ways to increase capacity. One approach may include the use of a WLAN to offload some of the traffic and/or signaling of a cellular network. WLANs (or WiFi networks) are attractive because, unlike cellular networks that operate in a licensed spectrum, WiFi networks generally operate in an unlicensed spectrum.

When devices that communicate using different protocols (e.g., cellular and WLAN protocols) share a spectrum, it may be useful to distinguish the signals transmitted by (or received from) different operators.

SUMMARY

The described features generally relate to one or more improved methods, systems, apparatuses, and/or devices for wireless communication. More particularly, the described features relate to the determination of sequences used in wireless communications. The sequences may be determined based on one or both of an operator identifier or a clear channel assessment (CCA) slot index.

In some examples, a method of wireless communication includes determining a sequence based on at least one of: an operator identifier associated with an operator using a spectrum or a clear channel assessment (CCA) slot index associated with the operator using the spectrum, and communicating over the spectrum using at least one channel based on the determined sequence.

In some examples, an apparatus for wireless communications includes a processor and memory coupled to the processor. The processor may be configured to determine a sequence based on at least one of: an operator identifier associated with an operator using a spectrum or a clear channel assessment (CCA) slot index associated with the operator using the spectrum, and communicate over the spectrum using at least one channel based on the determined sequence.

In some examples, an apparatus for wireless communications includes means for determining a sequence based on at least one of: an operator identifier associated with an operator using a spectrum or a clear channel assessment (CCA) slot index associated with the operator using the spectrum, and means for communicating over the spectrum using at least one channel based on the determined sequence.

In some examples, a non-transitory computer readable medium stores computer-executable code for wireless communications. The code may be executable by a processor to determine a sequence based on at least one of: an operator identifier associated with an operator using a spectrum or a clear channel assessment (CCA) slot index associated with the operator using the spectrum, and communicate over the spectrum using at least one channel based on the determined sequence.

In some examples, a method of wireless communication includes measuring channel quality information for a wireless channel, and transmitting a measurement report including the channel quality information and an operator identifier to a base station.

In some examples, an apparatus for wireless communications includes a processor and memory coupled to the processor. The processor may be configured to measure channel quality information for a wireless channel, and transmit a measurement report including the channel quality information and an operator identifier to a base station.

In some examples, an apparatus for wireless communications includes means for measuring channel quality information for a wireless channel, and means for transmitting a measurement report including the channel quality information and an operator identifier to a base station.

In some examples, a non-transitory computer readable medium stores computer-executable code for wireless communications. The code may be executable by a processor to measure channel quality information for a wireless channel, and transmit a measurement report including the channel quality information and an operator identifier to a base station.

The sequence may include a reference sequence and the at least one channel may include at least one of: a control channel, a data channel, a random access channel, a physical multicast channel, or a synchronization channel. Various examples of the methods, apparatuses, and/or non-transitory computer readable medium may include the features of, means for, modules for, processor configured to, and/or computer-executable code for generating at least one reference signal based on the determined sequence, wherein the at least one reference signal includes at least one of a sounding reference signal, a demodulation reference signal, a common reference signal, a channel-state information signal, a positioning reference signal, or a multicast-broadcast single-frequency network (MBSFN) reference signal. The spectrum may be a shared spectrum. In some cases, communicating over the spectrum using the at least one channel includes at least one of: scrambling data of the at least one channel based on the determined sequence or interleaving data of the at least one channel with the determined sequence.

In some cases, communicating over the spectrum using the at least one channel includes receiving the sequence over the at least one channel, and various examples of the methods, apparatuses, and/or non-transitory computer readable medium may include the features of, means for, modules for, processor configured to, and/or computer-executable code for identifying a cell based on the determined sequence.

In some cases, communicating over the spectrum using the at least one channel includes receiving the sequence over the at least one channel, and various examples of the methods, apparatuses, and/or non-transitory computer readable medium may include the features of, means for, modules for, processor configured to, and/or computer-executable code for determining the operator identifier based on the determined sequence. The sequence may be received in connection with a synchronization signal, and the operator identifier may be determined prior to decoding a master information block received from a base station associated with the operator. In some cases, determining the sequence may include determining an initial value of a sequence generator based on the operator identifier.

In some cases, the sequence may be further determined based on at least one of: a cell identifier, or a user equipment (UE) identifier, or a subframe index, or a slot index, or a symbol index, or a codeword index, or a cyclic prefix type index, or a multicast-broadcast single-frequency network (MBSFN) identifier. The operator identifier may be determined based on at least one of a public land mobile network (PLMN) identifier of the operator or a service identifier of the operator. A first operator may be associated with a first operator identifier for the spectrum that is separate from a second operator identifier associated with a second operator for the spectrum.

In some cases, the operator identifier includes a public land mobile network (PLMN) identifier. The measurement report may further include a cell identifier.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
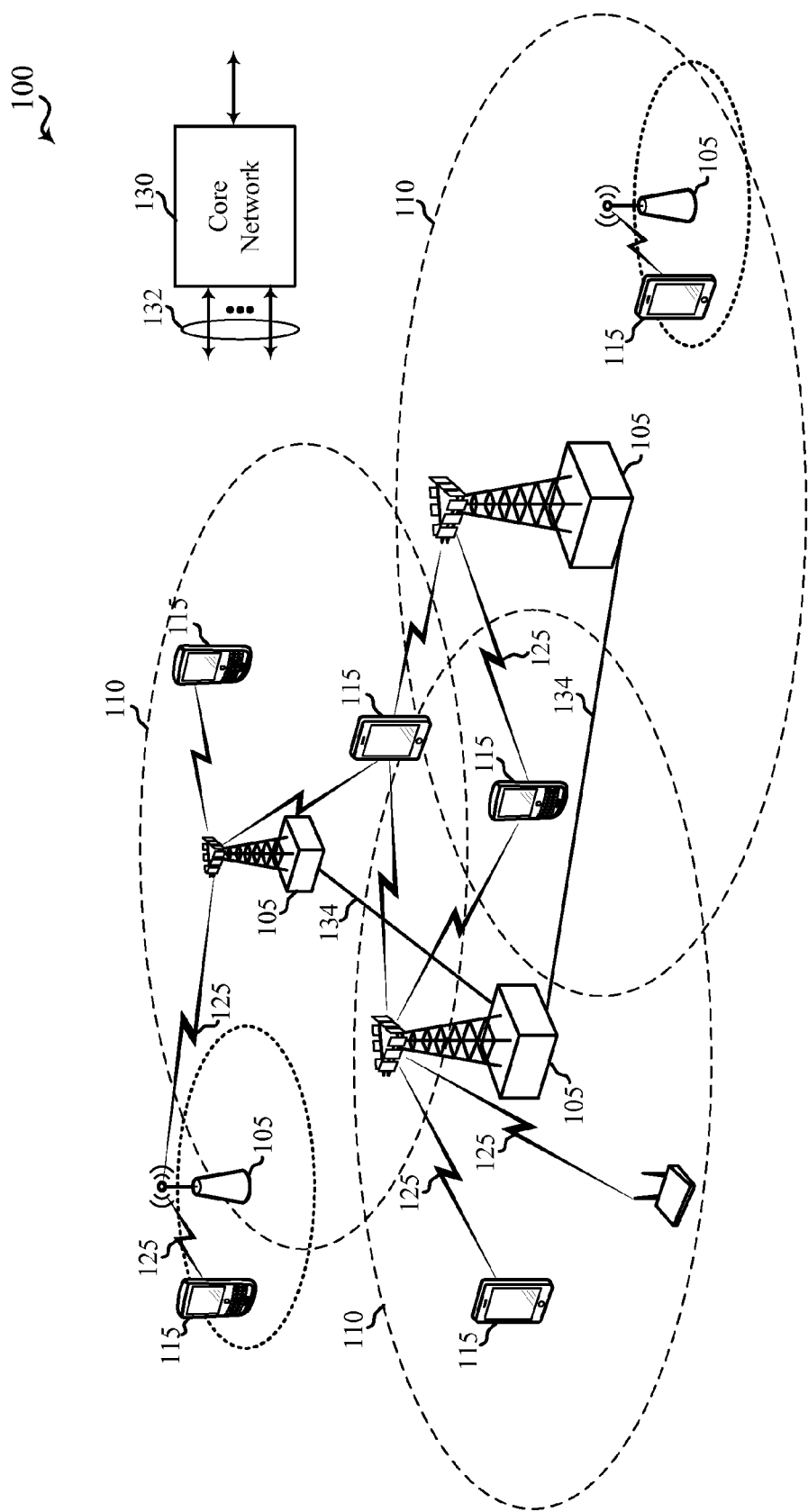
FIG. 1 shows a block diagram of a wireless communications system.

Methods, systems, apparatuses, and devices are described for determining sequences used in wireless communications. In a wireless communication system such as an LTE/LTE-A system, various channels and/or signals may be associated with sequences. The sequences may be used for purposes such as interference randomization, scrambling, interleaving, information carrying (e.g., the carrying of a physical cell indicator (PCI)), etc. The sequences associated with these channels may be functions of one or more parameters, such as: a physical or virtual cell identifier (cell ID), a cell group ID, a UE ID, a scrambling ID, a subframe index, a slot index, a symbol index, a codeword index, a cyclic prefix (CP) type index, and/or a multimedia-broadcast single-frequency network (MBSFN) ID. However, when sharing a communications spectrum (e.g., an LTE-U spectrum), there may be multiple operators wanting to share the same spectrum. In order to differentiate between the communications of different operators, an operator's public land mobile network (PLMN) or other operator identifier may be used. The methods, systems, apparatuses and devices disclosed herein therefore provide for determining sequences based on one or both of an operator identifier (e.g., a PLMN identifier) or a clear channel assessment (CCA) slot index.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Referring first to FIG. 1, a diagram illustrates an example of a wireless communications system 100. The system 100 includes a plurality of access points (e.g., base stations, eNBs, or WLAN access points) 105, a number of user equipments (UEs) 115, and a core network 130. Some of the access points 105 may communicate with the UEs 115 under the control of a base station controller (not shown), which may be part of the core network 130 or certain access points 105 (e.g., base stations or eNBs) in various examples. Some of the access points 105 may communicate control information and/or user data with the core network 130 through backhaul 132. In some examples, some of the access points 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communications link 125 may be a multi-carrier signal modulated according to various radio technologies. Each modulated signal may be sent on a different carrier and may carry control information (e.g., reference signals, control channels, etc.), overhead information, data, etc.

The access points 105 may wirelessly communicate with the UEs 115 via one or more access point antennas. Each of the access points 105 may provide communication coverage for a respective coverage area 110. In some examples, an access point 105 may be referred to as a base station, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a WiFi node or some other suitable terminology. The coverage area 110 for an access point may be divided into sectors making up only a portion of the coverage area (not shown). The system 100 may include access points 105 of different types (e.g., macro, micro, and/or pico base stations). The access points 105 may also utilize different radio technologies, such as cellular and/or WLAN radio access technologies. The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In some examples, the system 100 may include an LTE/LTE-A communications system (or network), which LTE/LTE-A communications system may support one or more LTE-U modes of operation or deployment scenarios. In other examples, the system 100 may support wireless communications using an unlicensed spectrum and an access technology different from LTE-U, or a licensed spectrum and an access technology different from LTE/LTE-A. In LTE/LTE-A communications systems, the term evolved NodeB or eNB may be generally used to describe of the access points 105. The system 100 may be a Heterogeneous LTE/LTE-A/LTE-U network in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul 132 (e.g., through core network 130). The wireless communications system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, pico eNBs, femto eNBs, relays, and the like. A UE 115 may also be able to communicate over different access networks, such as cellular or other WWAN access networks, or WLAN access networks.

The communications links 125 shown in system 100 may include uplinks for carrying uplink (UL) transmissions (e.g., from a UE 115 to an eNB 105) and/or downlinks for carrying downlink (DL) transmissions (e.g., from an eNB 105 to a UE 115). The UL transmissions may also be called reverse link transmissions, while the DL transmissions may also be called forward link transmissions. The downlink transmissions may be made using a licensed spectrum (e.g., LTE), an unlicensed spectrum (e.g., LTE-U), or both (LTE/LTE-U). Similarly, the uplink transmissions may be made using a licensed spectrum (e.g., LTE), an unlicensed spectrum (e.g., LTE-U), or both (LTE/LTE-U).

In some examples of the system 100, various deployment scenarios for LTE-U may be supported, including a supplemental downlink mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations or eNBs 105 as well as UEs 115 may support one or more of these or similar modes of operation. OFDMA communications signals may be used in the communications links 125 for LTE downlink transmissions in an unlicensed and/or a licensed spectrum, while SC-FDMA communications signals may be used in the communications links 125 for LTE uplink transmissions in an unlicensed and/or a licensed spectrum.

Figure 2A:
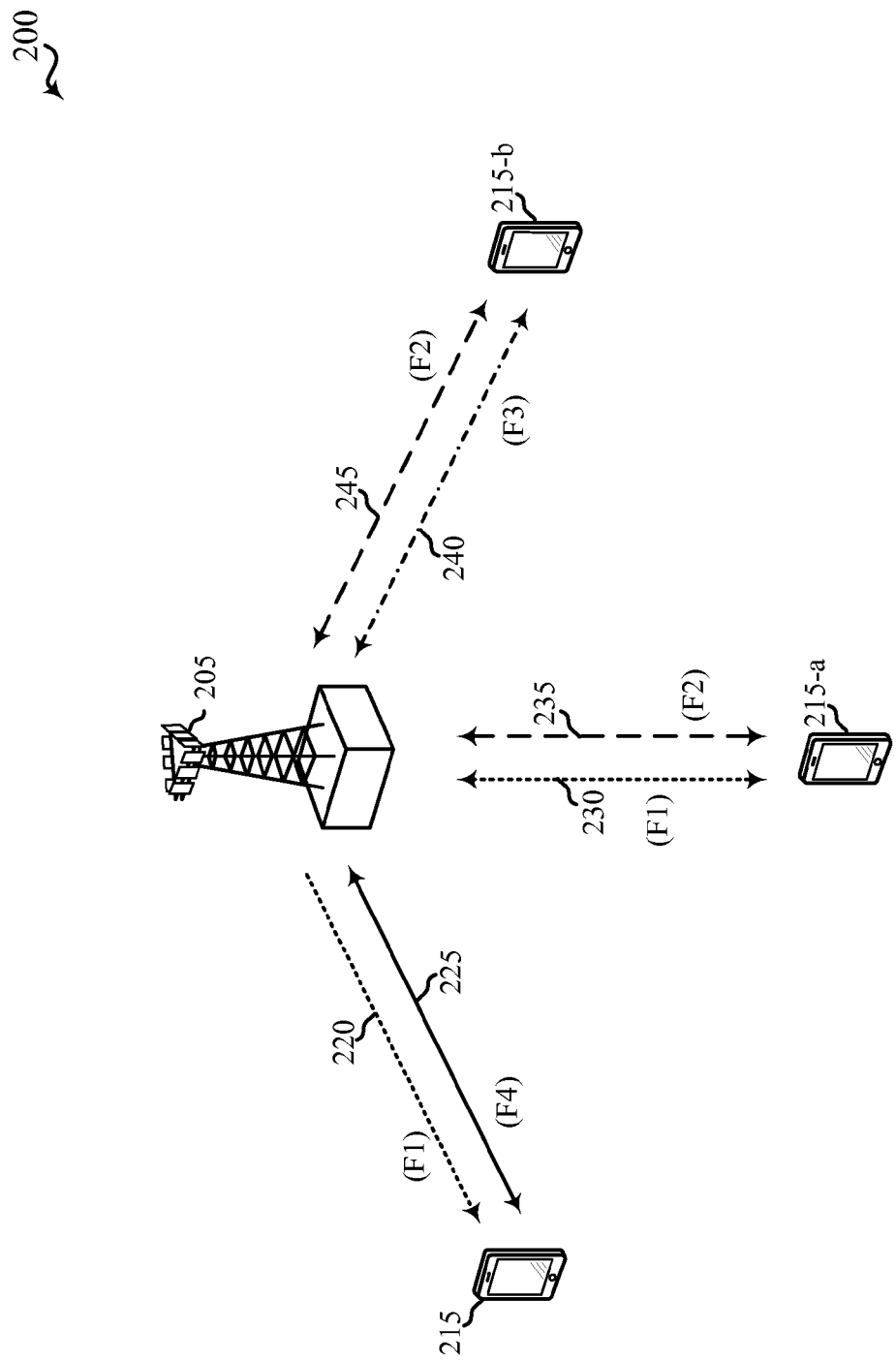
FIG. 2A shows a diagram that illustrates examples of deployment scenarios for using long term evolution (LTE) in an unlicensed spectrum according to various examples.

Turning next to FIG. 2A, a wireless communications system 200 illustrates examples of a supplemental downlink mode and a carrier aggregation mode for an LTE network that supports LTE-U. The system 200 may be an example of portions of the system 100 of FIG. 1. Moreover, the base station 205 may be an example of the base stations 105 of FIG. 1, while the UEs 215, 215-*a*, and 215-*b* may be examples of the UEs 115 of FIG. 1.

In the example of a supplemental downlink mode in the system 200, the base station 205 may transmit OFDMA communications signals to a UE 215 using a downlink 220. The downlink 220 may be associated with a frequency F1 in an unlicensed spectrum. The base station 205 may transmit OFDMA communications signals to the same UE 215 using a bidirectional link 225 and may receive SC-FDMA communications signals from that UE 215 using the bidirectional link 225. The bidirectional link 225 may be associated with a frequency F4 in a licensed spectrum. The downlink 220 in the unlicensed spectrum and the bidirectional link 225 in the licensed spectrum may operate concurrently. The downlink 220 may provide a downlink capacity offload for the base station 205. In some examples, the downlink 220 may be used for unicast services (e.g., addressed to one UE) services or for multicast services (e.g., addressed to several UEs). This scenario may occur with any service provider (e.g., traditional mobile network operator or MNO) that uses a licensed spectrum and has reason to relieve some of the traffic and/or signaling congestion.

In one example of a carrier aggregation mode in the system 200, the base station 205 may transmit OFDMA communications signals to a UE 215-*a* using a bidirectional link 230 and may receive SC-FDMA communications signals from the same UE 215-*a* using the bidirectional link 230. The bidirectional link 230 may be associated with the frequency F1 in the unlicensed spectrum. The base station 205 may also transmit OFDMA communications signals to the same UE 215-*a* using a bidirectional link 235 and may receive SC-FDMA communications signals from the same UE 215-*a* using the bidirectional link 235. The bidirectional link 235 may be associated with a frequency F2 in a licensed spectrum. The bidirectional link 230 may provide a downlink and uplink capacity offload for the base station 205. Like the supplemental downlink described above, this scenario may occur with any service provider (e.g., MNO) that uses a licensed spectrum and has reason to relieve some of the traffic and/or signaling congestion.

In another example of a carrier aggregation mode in the system 200, the base station 205 may transmit OFDMA communications signals to a UE 215-*b* using a bidirectional link 240 and may receive SC-FDMA communications signals from the same UE 215-*b* using the bidirectional link 240. The bidirectional link 240 may be associated with a frequency F3 in an unlicensed spectrum. The base station 205 may also transmit OFDMA communications signals to the same UE 215-*b* using a bidirectional link 245 and may receive SC-FDMA communications signals from the same UE 215-*b* using the bidirectional link 245. The bidirectional link 245 may be associated with the frequency F2 in the licensed spectrum. The bidirectional link 240 may provide a downlink and uplink capacity offload for the base station 205. This example and those provided above are presented for illustrative purposes and there may be other similar modes of operation or deployment scenarios that combine LTE and LTE-U for capacity offload.

As described above, the typical service provider that may benefit from the capacity offload offered by using LTE-U (LTE in an unlicensed band) is a traditional MNO with LTE spectrum. For these service providers, an operational configuration may include a bootstrapped mode (e.g., supplemental downlink, carrier aggregation) that uses the LTE primary component carrier (PCC) on the licensed spectrum and the LTE-U secondary component carrier (SCC) on the unlicensed spectrum.

In the carrier aggregation mode, data and control may generally be communicated in LTE (e.g., bidirectional links 225, 235, and 245) while data may generally be communicated in LTE-U (e.g., bidirectional links 230 and 240). The carrier aggregation mechanisms supported when using LTE-U may fall under a hybrid frequency division duplexing-time division duplexing (FDD-TDD) carrier aggregation or a TDD-TDD carrier aggregation with different symmetry across component carriers.

Figure 2B:
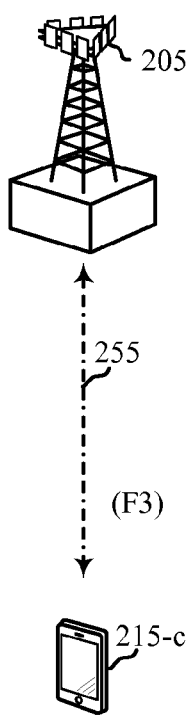
FIG. 2B shows a diagram that illustrates an example of a standalone mode using LTE in an unlicensed spectrum according to various examples.

FIG. 2B shows a wireless communications system 250 that illustrates an example of a standalone mode for LTE-U. The system 250 may be an example of portions of the system 100 of FIG. 1. Moreover, the base station 205 may be an example of the base stations 105 and/or 205 described with reference to FIGS. 1 and/or 2A, while the UE 215-*c* may be an example of the UEs 115 and/or 215 of FIGS. 1 and/or 2A.

In the example of a standalone mode in system 250, the base station 205 may transmit OFDMA communications signals to the UE 215-*c* using a bidirectional link 255 and may receive SC-FDMA communications signals from the UE 215-c using the bidirectional link 255. The bidirectional link 255 may be associated with the frequency F3 in an unlicensed spectrum described above with reference to FIG. 2A. The standalone mode may be used in non-traditional wireless access scenarios, such as in-stadium access (e.g., unicast, multicast). The typical service provider for this mode of operation may be a stadium owner, cable company, event host, hotel, enterprise, or large corporation that does not have licensed spectrum.

In some examples, a transmitting device such as an eNB 105 and/or base station 205 described with reference to FIGS. 1, 2A, and/or 2B, or a UE 115 and/or 215 described with reference to FIGS. 1, 2A, and/or 2B, may use a gating interval to gain access to a channel of the spectrum, such as a shared spectrum (e.g., to a physical channel of the licensed or unlicensed spectrum). The gating interval may define the application of a contention-based protocol, such as a Listen Before Talk (LBT) protocol based on the LBT protocol specified in ETSI (EN 301 893). When using a gating interval that defines the application of an LBT protocol, the gating interval may indicate when a transmitting device has a reason to perform a Clear Channel Assessment (CCA). The outcome of the CCA may indicate to the transmitting device whether a channel of the spectrum is available or in use. When the CCA indicates that the channel is available (e.g., "clear" for use), the gating interval may allow the transmitting device to use the channel—typically for a predefined transmission interval. When the CCA indicates that the channel is not available (e.g., in use or reserved), the gating interval may prevent the transmitting device from using the channel during the transmission interval.

Figure 3:
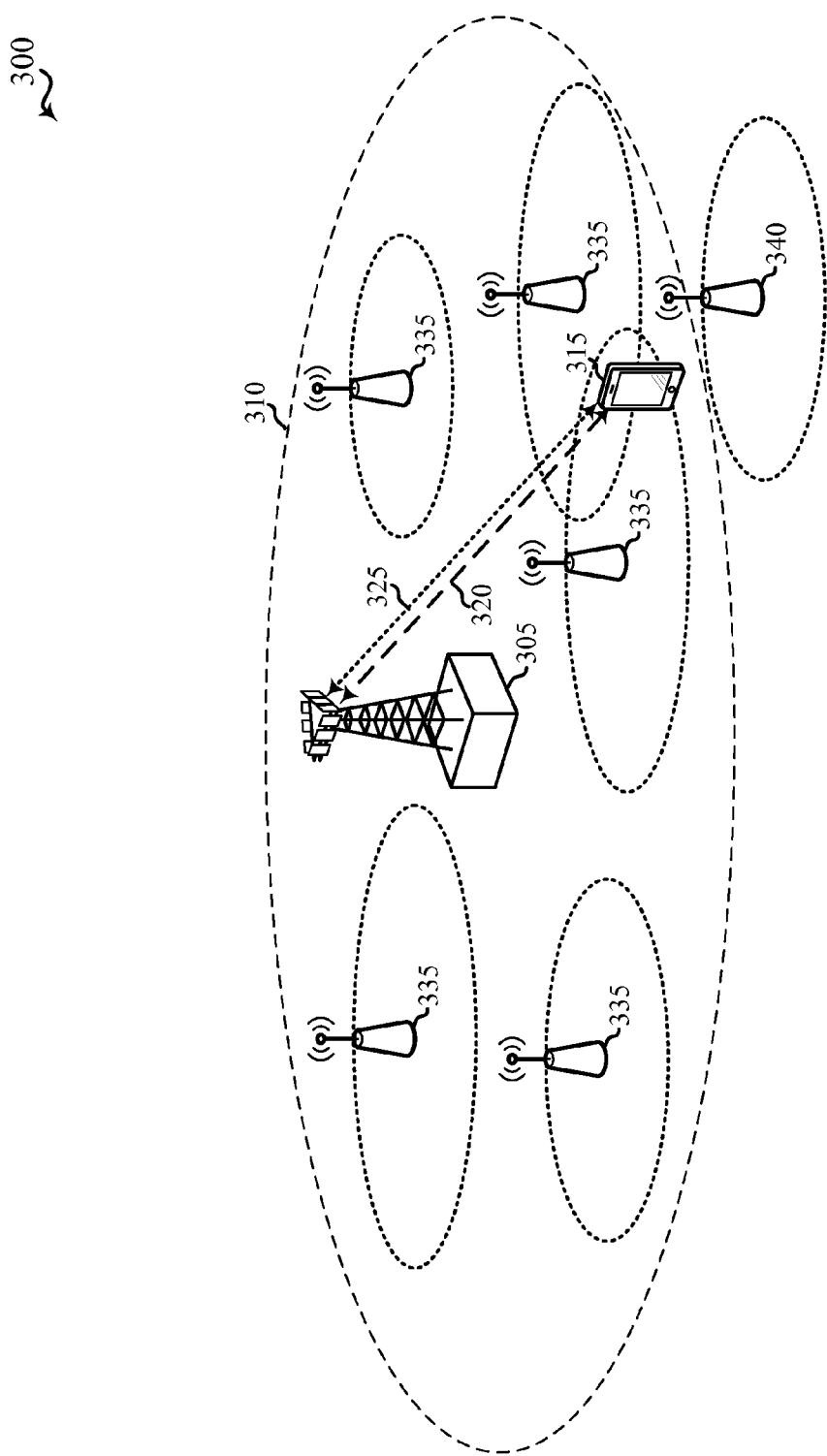
FIG. 3 shows a block diagram of a wireless communications system in which a number of wireless access points and a UE are within the coverage area of an eNB.

FIG. 3 illustrates a wireless communications system 300 in which a number of wireless access points (e.g., WiFi nodes) 335 and a UE 315 are within the coverage area 310 of an eNB 305. In some examples, the eNB 305, UE 315, and/or wireless access points 335 may be respective examples of one or more aspects of the eNBs 105 and/or 205, UEs 115 and/or 215, and/or wireless access points 105 described with reference to FIGS. 1, 2A, and/or 2B.

The eNB 305 and UE 315 may communicate with one another over a licensed or unlicensed spectrum using either or both of a bidirectional link 320 in a licensed spectrum (e.g., an LTE/LTE-A spectrum) and a bidirectional link 325 in an unlicensed spectrum (e.g., an LTE-U spectrum). Such communication may be an example of the carrier aggregation scenario described above with respect to FIG. 2A.

When attempting to reserve access to the bidirectional link 325 in the unlicensed spectrum, both the eNB 305 and the UE 315 may perform CCAs to determine availability of the unlicensed spectrum. In some cases, both the eNB 305 and the UE 315 may perform a CCA, to account for the presence of wireless access points 340 and/or other potential transmitting devices that are outside the coverage area 310 of the eNB 305, but within range of the UE 315. Such wireless access points 340 may be referred to as "hidden nodes," because their presence may be unknown to and hidden from the eNB 305. Thus, in the absence of the UE 315 performing CCA to discover possible transmissions of the wireless access point 340, the eNB 305 might determine that the unlicensed spectrum is available in a particular transmission interval when, in fact, a hidden wireless access point 340 has already reserved the unlicensed spectrum for communication with a device or devices in the vicinity of the UE 315.

In some cases, it may be useful for a transmitting device to generate a gating interval on a periodic basis and synchronize at least one boundary of the gating interval with at least one boundary of a periodic frame structure. For example, it may be useful to generate a periodic gating interval for a cellular downlink in a spectrum, such as a shared spectrum, and to synchronize at least one boundary of the periodic gating interval with at least one boundary of a periodic frame structure (e.g., LTE/LTE-A radio frame) associated with the cellular downlink. Examples of such synchronization are shown in FIG. 4.

Figure 4:
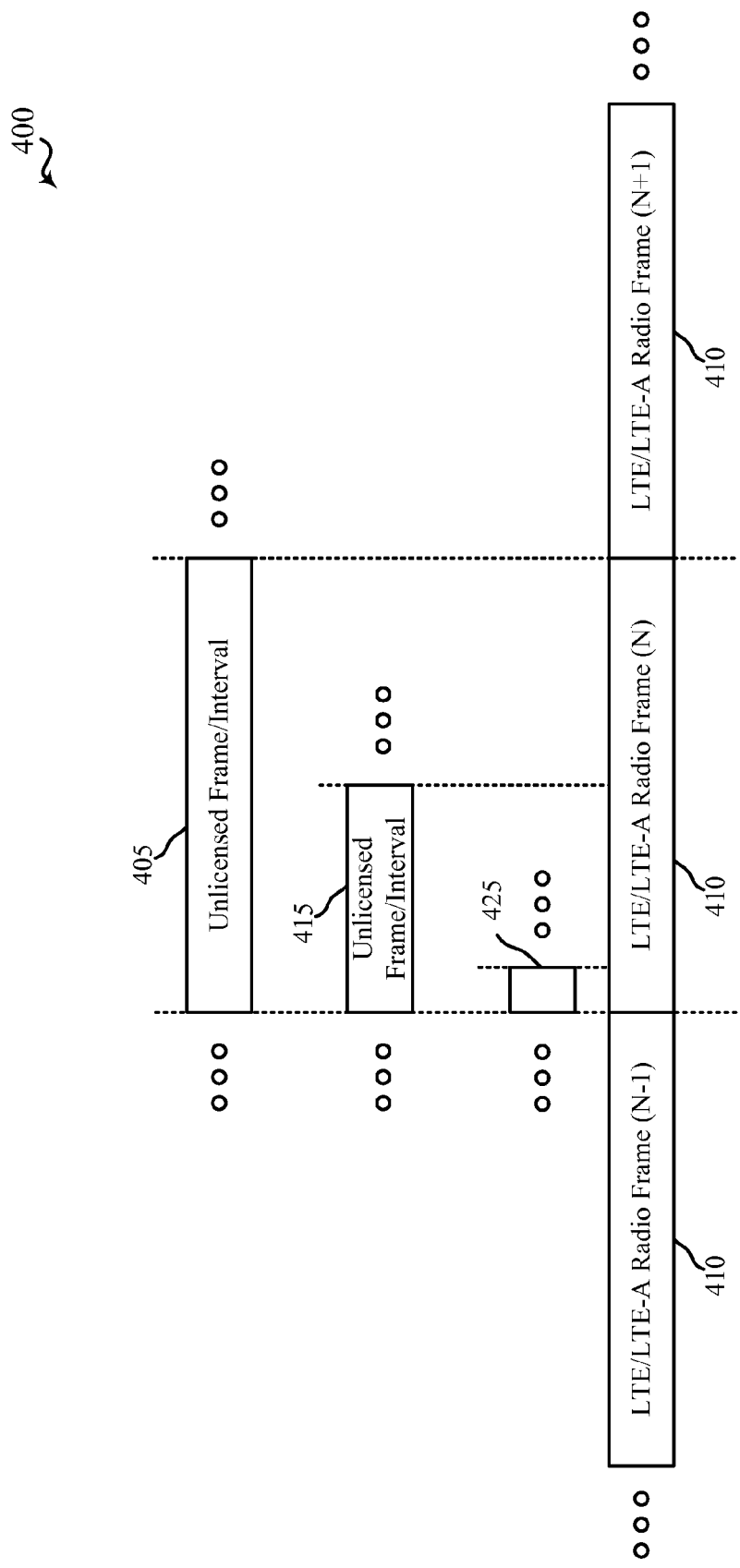
FIG. 4 shows various examples of unlicensed frames/intervals and their relationships to a periodic frame structure including, for example, LTE radio frames.

FIG. 4 illustrates examples 400 of an unlicensed frame/interval 405, 415, and/or 425 for a cellular downlink in an unlicensed spectrum. The unlicensed frame/interval 405, 415, and/or 425 may be used as a periodic gating interval by an eNB that supports transmissions over the unlicensed spectrum (e.g., an LTE-U spectrum). Examples of such an eNB may be the access points 105 and/or base stations 205 described with reference to FIGS. 1, 2A, and/or 2B. The unlicensed frame/interval 405, 415, and/or 425 may be used with the system 100, 200, and/or 250 described with reference to FIGS. 1, 2A, and/or 2B.

By way of example, the duration of the unlicensed frame/interval 405 is shown to be equal to (or approximately equal to) a duration of an LTE/LTE-A radio frame 410 of a periodic frame structure associated with a cellular downlink. In some examples, "approximately equal" means the duration of the unlicensed frame/interval 405 is within a cyclic prefix (CP) duration of the duration of the periodic frame structure.

At least one boundary of the unlicensed frame/interval 405 may be synchronized with at least one boundary of the periodic frame structure that includes the LTE/LTE-A radio frames N−1 to N+1. In some cases, the unlicensed frame/interval 405 may have boundaries that are aligned with the frame boundaries of the periodic frame structure. In other cases, the unlicensed frame/interval 405 may have boundaries that are synchronized with, but offset from, the frame boundaries of the periodic frame structure. For example, the boundaries of the unlicensed frame/interval 405 may be aligned with subframe boundaries of the periodic frame structure, or with subframe midpoint boundaries (e.g., the midpoints of particular subframes) of the periodic frame structure.

In some cases, the periodic frame structure may include LTE/LTE-A radio frames N−1 to N+1. Each LTE/LTE-A radio frame 410 may have a duration of ten milliseconds, for example, and the unlicensed frame/interval 405 may also have a duration of ten milliseconds. In these cases, the boundaries of the unlicensed frame/interval 405 may be synchronized with the boundaries (e.g., frame boundaries, subframe boundaries, or subframe midpoint boundaries) of one of the LTE/LTE-A radio frames (e.g., the LTE/LTE-A radio frame (N)).

By way of example, the duration of the unlicensed frames/intervals 415 and 425 are shown to be sub-multiples of (or approximate sub-multiples of) the duration of the periodic frame structure associated with the cellular downlink. In some examples, an "approximate sub-multiple of" means the duration of the unlicensed frame/interval 415, 425 is within a cyclic prefix (CP) duration of the duration of a sub-multiple of (e.g., half or one-tenth) the periodic frame structure. For example, the unlicensed frame/interval 415 may have a duration of five milliseconds and the unlicensed frame/interval 425 may have a duration of 1 or 2 milliseconds.

Figure 5:
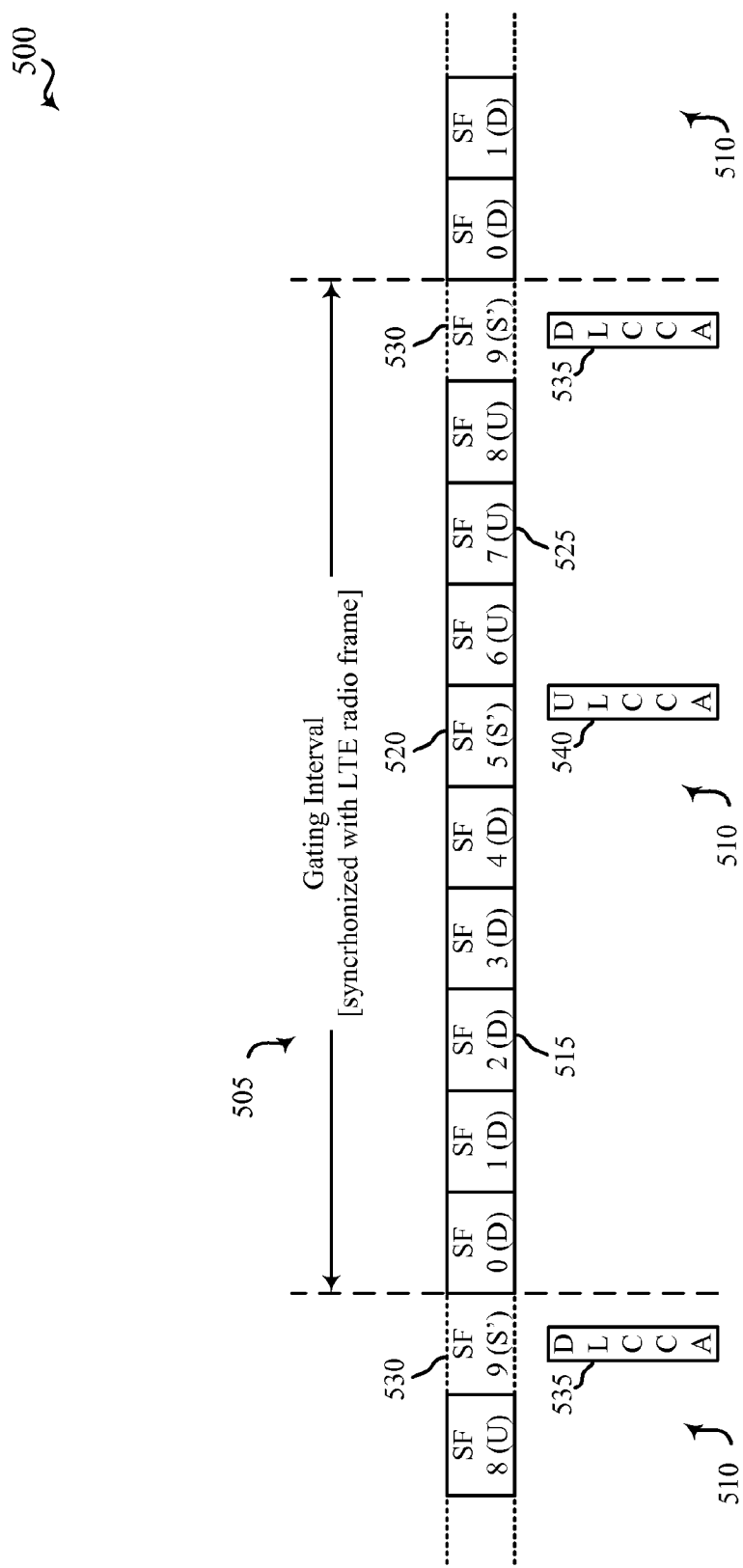
FIG. 5 shows a diagram that illustrates an example of a periodic gating structure waveform according to various examples.

FIG. 5 illustrates an example 500 of a periodic gating interval 505 usable by both a cellular downlink and a cellular uplink in an unlicensed spectrum. The periodic gating interval 505 may be used by eNBs and UEs that support LTE-U. Examples of such eNBs may be the eNBs 105, 205, and 305 described with reference to FIGS. 1, 2A, 2B and 3. Examples of such UEs may be the UEs 115, 215, and 315 described with reference to FIGS. 1, 2A, 2B, and 3.

By way of example, the duration of the periodic gating interval 505 is shown to be equal to (or approximately equal to) the duration of a periodic frame structure 510 associated with the cellular downlink. The boundaries of the periodic gating interval 505 may be synchronized with (e.g., aligned with) the boundaries of the periodic frame structure 510.

The periodic frame structure 510 may include an LTE/LTE-A radio frame having ten subframes (e.g., SF0, SF1, . . . , SF9). Subframes SF0 through SF4 may be downlink (D) subframes 515, subframe SF5 may be a special (S') subframe 520, subframes SF6 through SF 8 may be uplink (U) subframes 525, and subframe SF9 may be a special (S') subframe 530. The S' subframe SF9 may be used by an eNB to perform a CCA for a downlink transmission (e.g., a downlink CCA or DLCCA 535) in subframes SF0 through SF4. The S' subframe SF5 may be used by a UE to perform a CCA for an uplink transmission (e.g., an uplink CCA or ULCCA 540) in subframes SF6 through part of SF9.

Because the S' subframes 530 and 520 have durations of one millisecond, they may include one or more CCA slots or windows 535, 540 in which the transmitting devices contending for a particular physical channel of an unlicensed spectrum may perform their CCAs. When a transmitting device's CCA indicates the physical channel is available, but the device's CCA is completed before the end of the periodic gating interval 505, the device may transmit one or more signals to reserve the channel until the end of the periodic gating interval 505. The one or more signals may in some cases include Channel Usage Pilot Signals (CUPS), Channel Usage Beacon Signals (CUBS), and/or a cell-specific reference signal (CRS). CUPS, CUBS, and/or a CRS may be used for both channel synchronization and channel reservation. That is, a device that performs a CCA for the channel after another device begins to transmit CUPS, CUBS, or a CRS on the channel may detect the energy of the CUPS, CUBS, or CRS and determine that the channel is currently unavailable.

Following a transmitting device's successful completion of CCA for a physical channel and/or the transmission of CUPS, CUBS, or a CRS over a physical channel, the transmitting device may use the physical channel for up to a predetermined period of time (e.g., a portion of an LTE/LTE-A radio frame) to transmit a waveform (e.g., an LTE-based waveform).

Figure 6:
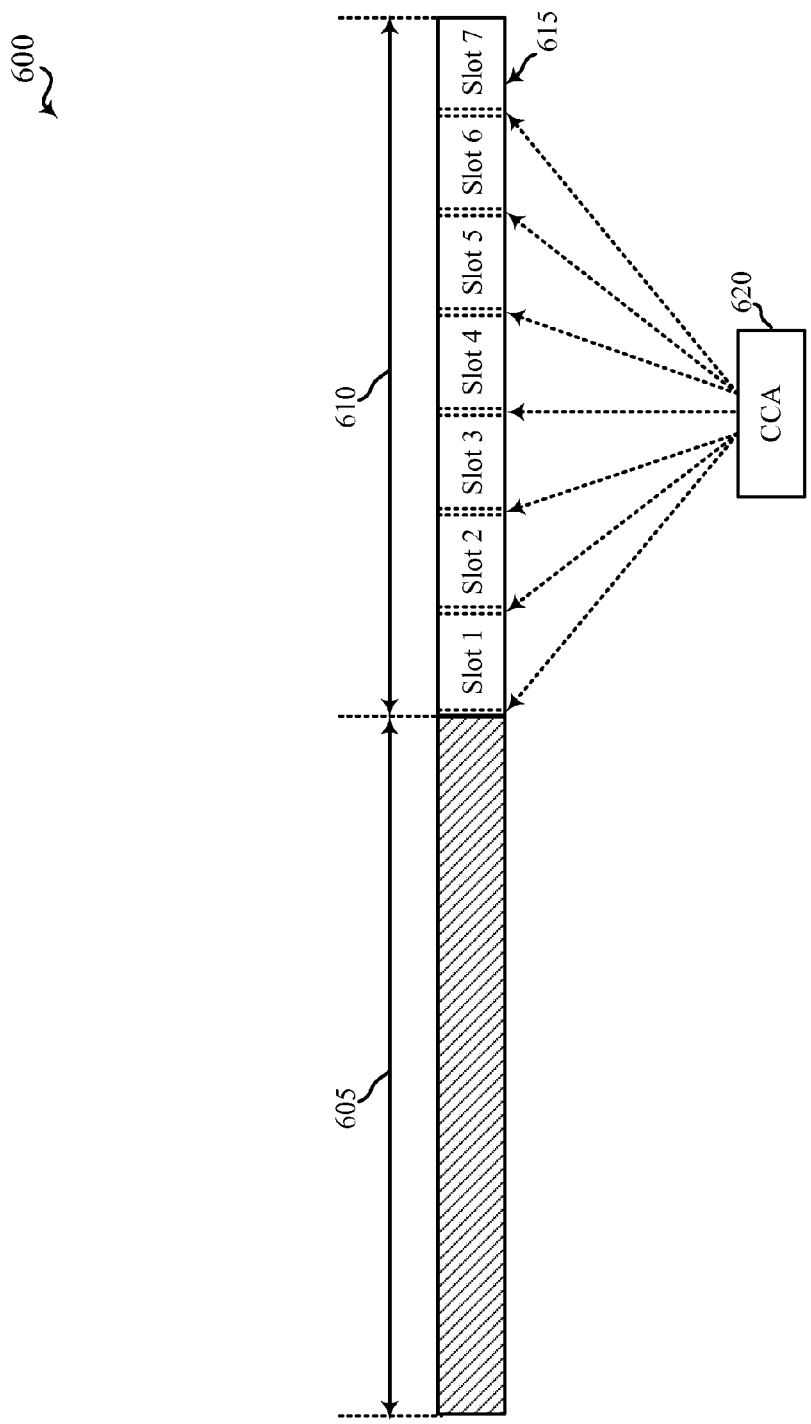
FIG. 6 shows a diagram that illustrates an example of placement options for clear channel assessment (CCA) slots in an S' subframe according to various examples.

FIG. 6 illustrates how a contention-based protocol such as LBT may be implemented within an S' subframe 600 of a gating interval, such as an S' subframe 520 of the ten millisecond periodic gating interval 505 described with reference to FIG. 5. The contention-based protocol may be used with, for example, the system 100, 200, 250, and/or 300, access points or eNBs 105, 205, and/or 305, and/or UEs 115, 215, and/or 315 described with reference to FIGS. 1, 2A, 2B, and/or 3.

The S' subframe 600 may have a guard period (or silent period) 605 and a CCA period 610. By way of example, each of the guard period 605 and the CCA period 610 may have a duration of 0.5 milliseconds and include seven OFDM symbol positions 615 (labeled in FIG. 6 as Slots 1 through 7). In the case of a DLCCA 535 (FIG. 5), the guard period 605 may be replaced with an uplink transmission period.

In some cases, an eNB may select one or more of the OFDM symbol positions 615 to perform a CCA 620 for a subsequent transmission interval of an unlicensed spectrum, to determine whether the transmission interval of the unlicensed spectrum is available for a transmission during the transmission interval. In some cases, different ones of the OFDM symbol positions 615 may be pseudo-randomly identified or selected by an eNB in different occurrences of the S' subframe 600 (i.e., in different S' subframes used to perform CCA 620 for different transmission intervals of the unlicensed spectrum). The pseudo-random identification or selection of OFDM symbol positions may be controlled using a hopping sequence. In other cases, the same OFDM symbol position 615 may be selected by an eNB in different occurrences of the S' subframe.

The eNBs of a wireless communications system may be operated by the same or different operators. In some examples, the eNBs operated by different operators may select different ones of the OFDM symbol positions 615 in a particular S' subframe 600, thereby avoiding CCA collisions between different operators. If the pseudo-random selection mechanisms of different operators are coordinated, OFDM symbol positions 615 may be pseudo-randomly selected by a plurality of different operators such that the eNBs of the different operators each have an equal opportunity to perform CCA 620 in the earliest OFDM symbol position (i.e., Slot 1) for certain transmission intervals. Thus, over time, the eNBs of the different operators may each have an opportunity to perform CCA 620 first and gain access to a transmission interval of the unlicensed spectrum regardless of whether eNBs of other operators desire to access the medium. After a successful CCA 620, an eNB may transmit CUPS, CUBS, or a CRS to prevent other devices and/or operators from using one or more physical channels of the transmission interval of the unlicensed spectrum.

In a wireless communications system such as an LTE/LTE-A system, various channels and/or signals may be associated with sequences. The sequences may be used for purposes such as interference randomization, scrambling, interleaving, information carrying (e.g., the carrying of a physical cell indicator (PCI)), etc. Some of the channels and signals that may be associated with sequences in an LTE/LTE-A system include a primary synchronization signal (PSS), a secondary synchronization signal (SSS), a physical broadcast channel (PBCH), a cell-specific reference signal (CRS), a demodulation reference signal (DM-RS), a channel state information reference signal (CSI-RS), a positioning reference signal (PRS), a multimedia broadcast/multicast service (MBMS), a physical downlink control channel (PDCCH), an enhanced PDCCH (EPDCCH), a physical downlink shared channel (PDSCH), a physical random access channel (PRACH), a physical uplink control channel (PUCCH), and/or a sounding reference signal (SRS). The sequences associated with these channels may be functions of one or more parameters, such as: a physical or virtual cell identifier (cell ID), a cell group ID, a UE ID, a scrambling ID, a subframe index, a slot index, a symbol index, a codeword index, a cyclic prefix (CP) type index, and/or a multimedia-broadcast single-frequency network (MBSFN) ID. For example, a PSS sequence may be a function of a cell group ID (e.g., 0/1/2) as part of a cell ID. An SSS sequence may be a function of a cell ID; and a CRS sequence initialization, $c_{init}$, may be based on the formula:

$$c_{init}=2^{10}\cdot(7\cdot(n_s+1)+l+1)\cdot(2\cdot N_{ID}^{cell}+1)+2\cdot N_{ID}^{cell}+N_{CP} \qquad \text{Eq. 1}$$

where $n_s$ is a slot index (e.g., a slot number), l is a symbol index (e.g., OFDM symbol number), $N_{ID}^{cell}$ is a physical cell ID, and $N_{CP}$ is a CP type index.

When sharing a communications spectrum (e.g., an LTE-U spectrum), there may be many operators wanting to share the same spectrum. In order to differentiate between the communications of different operators, the operator's public land mobile network (PLMN) identifier may be used. An operator's PLMN identifier may in some cases be signaled as part of a system information broadcast in PBCH. Additionally or alternatively, the operators may be differentiated using other types of operator identifiers, such as service identifiers.

Also when communicating in a shared spectrum such as an LTE-U spectrum, different operators may use different CCA slots to contend for access to the LTE-U spectrum. However, the number of operators using a shared spectrum may in some cases exceed the number of CCA slots; and even when the number of operators does not exceed the number of CCA slots, hidden node issues may result in interference between the transmission of a first operator and the transmission or reception of a second operator. As an example, two nodes associated with separate operators in a frame may use two different CCA slots. However, due to the distance between the nodes and/or other conditions (e.g., channel conditions), one node may not be able to sense the DL transmissions from the other node, such that both nodes may have CCA cleared for the frame. However, if a UE is located in between the two nodes and is only served by one of the two nodes, the UE may observe non-negligible interference from the other node.

For the above and other reasons, the inter-operator interference in a shared spectrum may be significant. The interference becomes even more significant when there are neighboring cells of different operators sharing the same cell ID. Also, before decoding PBCH (or another system information broadcast), a UE may not have an operator's PLMN identifier and hence could experience PCI confusion across different operators.

Figure 7A:
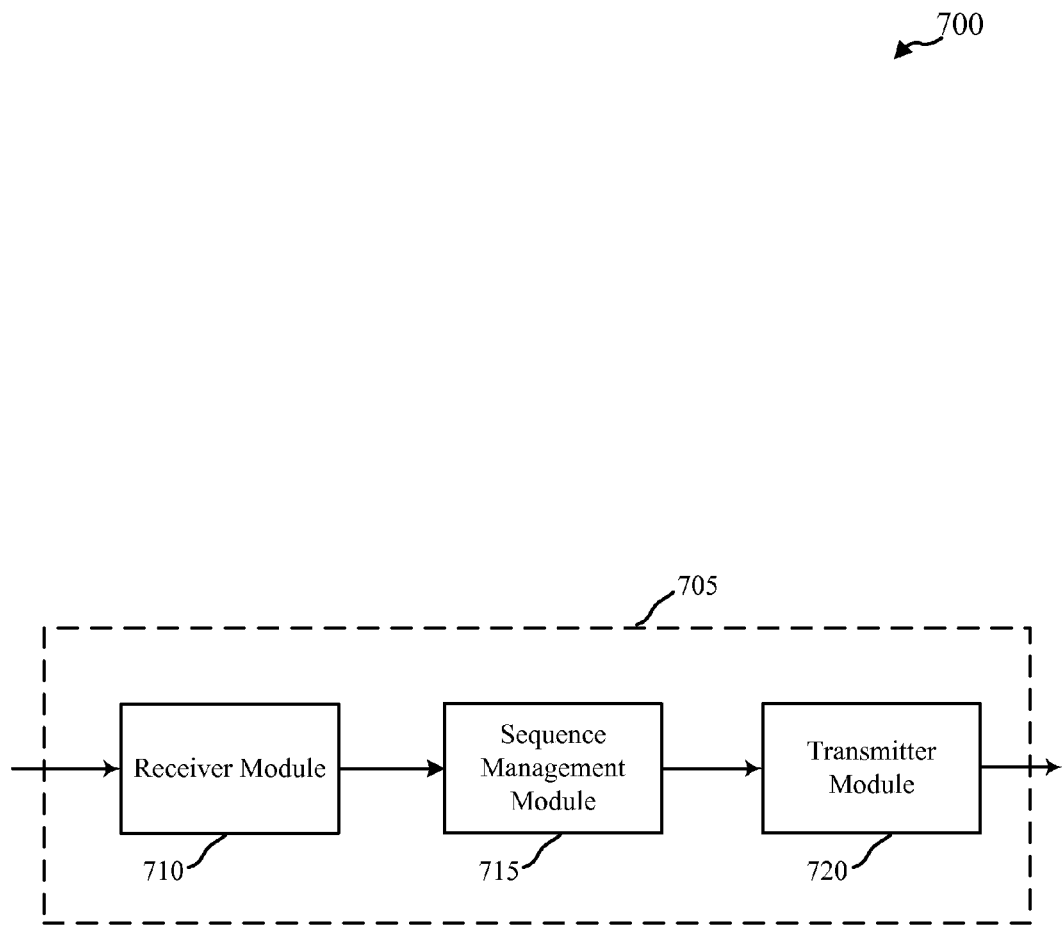
FIGS. 7A & 7B show block diagrams of examples of devices (e.g., eNBs or UEs) according to various examples.

Referring now to FIG. 7A, a block diagram 700 illustrates a device 705 for use in wireless communications in accordance with various examples. In some examples, the device 705 may be an example of one or more aspects of one of the eNBs 105, 205, and/or 605 or one of the UEs 115, 215, and/or 615 described with reference to FIGS. 1, 2A, 2B and/or 6. The device 705 may also be a processor. The device 705 may include a receiver module 710, a sequence management module 715, and/or a transmitter module 720. Each of these components may be in communication with each other.

The components of the device 705 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 710 may be or include a radio frequency (RF) receiver, such as an RF receiver operable to receive transmissions in a licensed spectrum (e.g., an LTE/LTE-A spectrum) and/or an unlicensed spectrum (e.g., an LTE-U spectrum). The receiver module 710 may be used to receive various types of data and/or control signals (i.e., transmissions) over one or more communication links (e.g., physical channels) of a wireless communications system including the licensed and/or unlicensed spectrums, such as one or more communication links of the wireless communications system 100, 200, 250, and/or 600 described with reference to FIGS. 1, 2A, 2B, and/or 6.

In some examples, the transmitter module 720 may be or include an RF transmitter, such as an RF transmitter operable to transmit in the licensed spectrum and/or the unlicensed spectrum. The transmitter module 720 may be used to transmit various types of data and/or control signals (i.e., transmissions) over one or more communication links (e.g., physical channels) of a wireless communications system, such as one or more communication links of the wireless communications system 100, 200, 250, and/or 600 described with reference to FIGS. 1, 2A, 2B, and/or 6.

In some examples, the sequence management module 715 may be used to manage sequences for wireless communications over a spectrum. Sequence management may in some cases involve determining a sequence based on at least one of an operator identifier associated with an operator using a spectrum or a CCA slot index associated with an operator using the spectrum. The sequence may in some cases be determined for the purpose of generating the sequence and transmitting the sequence over at least one channel of the spectrum. In other cases, the sequence may be determined for the purpose of receiving the sequence over at least one channel of the spectrum. In some cases, the sequence management module 715 may be used to determine a measurement report. The measurement report may include an operator identifier, a cell identifier, and/or channel quality information. The sequence management module 715 may communicate with the transmitter module 720 to transmit the measurement report, such as to an eNB 105.

Figure 7B:
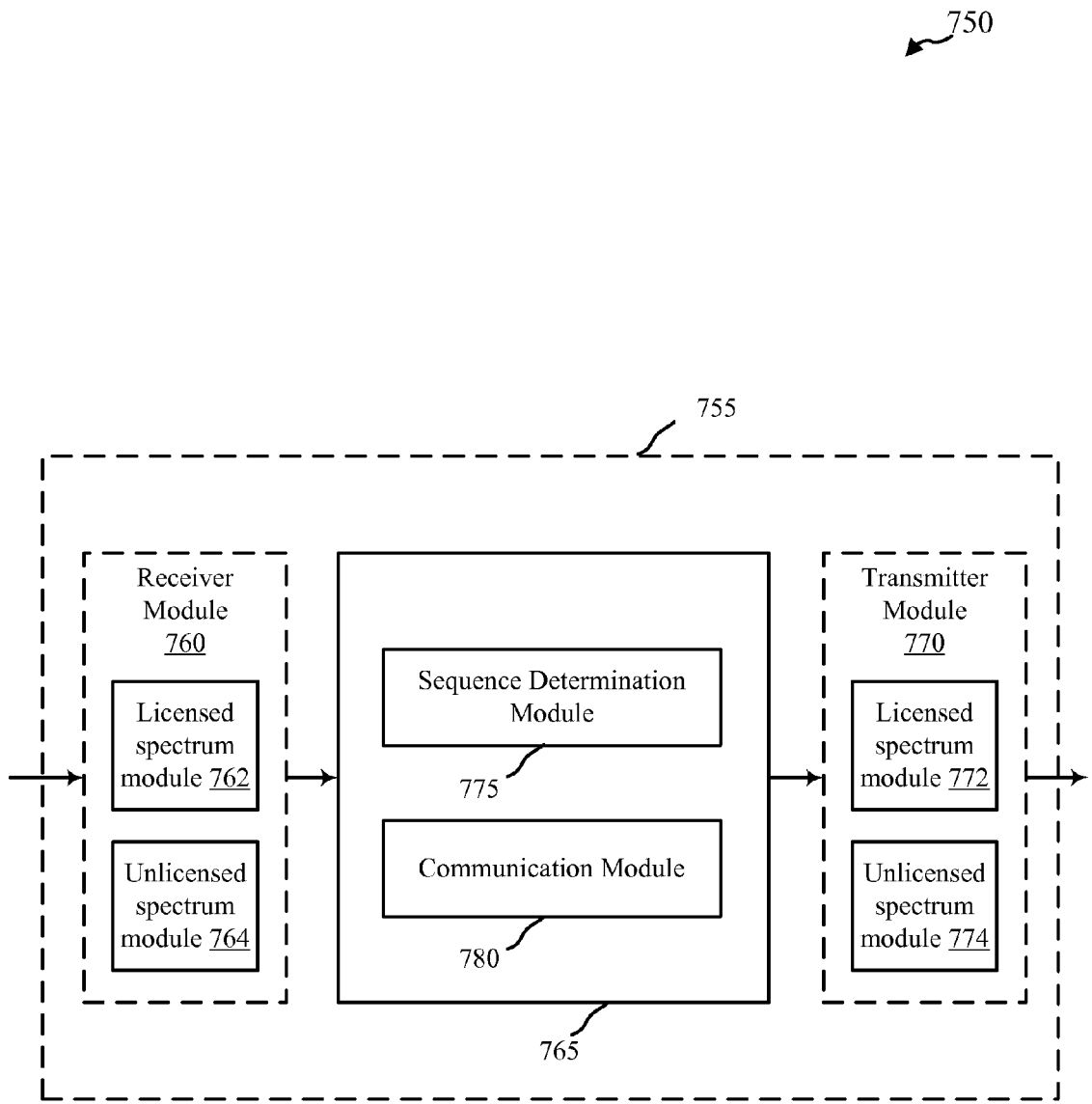

Referring now to FIG. 7B, a block diagram 750 illustrates a device 755 for use in wireless communications in accordance with various examples. In some examples, the device 755 may be an example of one or more aspects of one of the eNBs 105, 205, and/or 605 or one of the UEs 115, 215, and/or 615 described with reference to FIGS. 1, 2A, 2B and/or 6. The device 755 may also be a processor. The device 755 may include a receiver module 760, a sequence management module 765, and/or a transmitter module 770. Each of these components may be in communication with each other.

The components of the device 755 may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 760 may be or include an RF receiver, such as an RF receiver operable to receive transmissions in a licensed spectrum (e.g., an LTE/LTE-A spectrum) and/or an unlicensed spectrum (e.g., an LTE-U spectrum). The RF receiver may include separate receivers for the licensed spectrum and the unlicensed spectrum. The separate receivers may in some cases take the form of a licensed spectrum module 762 and an unlicensed spectrum module 764. The receiver module 760, including the licensed spectrum module 762 and/or the unlicensed spectrum module 764, may be used to receive various types of data and/or control signals (i.e., transmissions) over one or more communication links (e.g., physical channels) of a wireless communications system including the licensed and unlicensed spectrums, such as one or more communication links of the wireless communications system 100, 200, 250, and/or 600 described with reference to FIGS. 1, 2A, 2B, and/or 6.

In some examples, the transmitter module 770 may be or include an RF transmitter, such as an RF transmitter operable to transmit in the licensed spectrum and/or the unlicensed spectrum. The RF transmitter may include separate transmitters for the licensed spectrum and the unlicensed spectrum. The separate transmitters may in some cases take the form of a licensed spectrum module 772 and an unlicensed spectrum module 774. The transmitter module 770, including the licensed spectrum module 772 and/or the unlicensed spectrum module 764, may be used to transmit various types of data and/or control signals (i.e., transmissions) over one or more communication links (e.g., physical channels) of a wireless communications system, such as one or more communication links of the wireless communications system 100, 200, 250, and/or 600 described with reference to FIGS. 1, 2A, 2B, and/or 6.

In some examples, the sequence management module 765 may be an example of one or more aspects of the sequence management module 715 described with reference to FIG. 7A and may include a sequence determination module 775 and/or a communication module 780.

In some examples, the sequence determination module 775 may be used to determine a sequence as a function of at least one of: an operator identifier associated with an operator using a spectrum (e.g., an LTE-U spectrum) or a CCA slot index associated with the operator using the spectrum.

In some examples, an operator identifier may be determined based on a PLMN identifier of the operator. A first operator may be associated with a first operator identifier for the spectrum; a second operator may be associated with a second operator identifier for the spectrum; and so on. Each of the operator identifiers may be separate (e.g., different) from one another.

In some examples, the CCA slot index associated with the operator using the spectrum may be fixed over time. In other examples, the CCA slot index associated with the operator using the spectrum may vary over time.

In some examples, determining the sequence may include determining an initial value of a sequence generator based on the operator identifier. For example, an initial value ($c_{init}$) of a DM-RS sequence may be determined based on a PLMN identifier according to the following equation:

$$c_{init} = (\lfloor n_s/2 \rfloor + 1) \cdot (2N_{ID}^{cell} + 1) \cdot 2^{16} + n_{PLMN} \cdot 2^2 + n_{SCID} \qquad \text{Eq. 2}$$

where $n_s$ is a slot index (e.g., a slot number within a subframe), $N_{ID}^{cell}$ is a physical cell ID, $n_{PLMN}$ is a PLMN identifier determined by mapping a PLMN to a limited number of values (e.g., 0 to 6), and $n_{SCID}$ is a scrambling code identity.

As another example, an initial value ($c_{init}$) of a PUSCH sequence may be determined based on a CCA slot index according to the following equation:

$$c_{init} = n_{CCA} \cdot 2^{30} + n_{RNTI} \cdot 2^{14} + q \cdot 2^{13} + \lfloor n_s/2 \rfloor \cdot 2^9 + N_{ID}^{cell} \qquad \text{Eq. 3}$$

where $n_{CCA}$ is a CCA slot index, $n_{CCA}$ is a radio network temporary identifier, and q is a codeword index.

In some examples, the sequence may be further determined based on at least one of: a cell identifier, or a UE identifier, or a subframe index, or a slot index, or a symbol index, or a codeword index, or a cyclic prefix type index, or a multicast-broadcast single-frequency network (MBSFN) identifier. For example, an SSS sequence may be determined as a function of both PLMN and PCI by mapping a PLMN identifier to one of a limited number of values (e.g., 0 to 6) and using a combination of the PCI and PLMN identifier to effectively increase the original PCI space.

In some examples, the communication module 780 may be used to communicate over the spectrum using at least one channel, based on the sequence determined by the sequence determination module 775. In some examples, the communication module 780 may be used to determine a measurement report. The measurement report may include an operator identifier, a cell identifier, and/or channel quality information. Channel quality information may include a reference signal received power (RSRP), a reference signal received quality (RSRQ), a received signal strength indicator (RSSI), a packet error rate associated with one or more channels, an interference level, and/or an interference over thermal. The communication module 780 may communicate with the transmitter module 770 to transmit the measurement report, such as to an eNB 105.

In some examples (e.g., when the device 755 is configured as a transmitting device), communicating over the spectrum using the at least one channel may include scrambling data of the at least one channel based on the determined sequence or interleaving data of the at least one channel with the determined sequence. In other examples (e.g., when the device 755 is configured as a receiving device), communicating over the spectrum using the at least one channel may include receiving the sequence over the at least one channel.

The at least one channel may include at least one of: a control channel, a data channel, a random access channel, a physical multicast channel, or a synchronization channel.

The sequence management module 765 may be useful in facilitating, for example, early identification of an operator identifier, and/or randomization of sequences for scrambling, interleaving, interference handling, etc.

Figure 8:
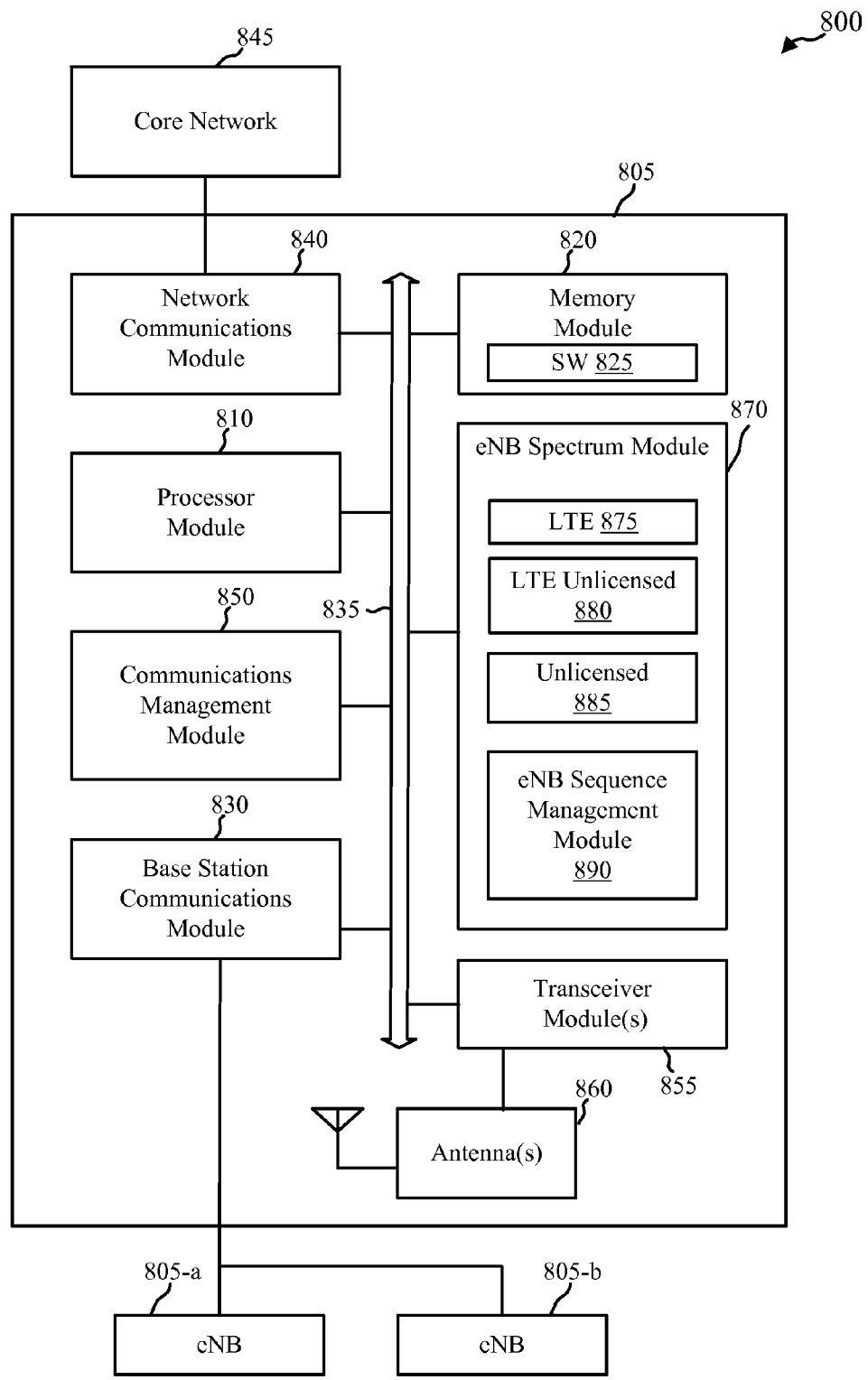
FIG. 8 shows a block diagram of an eNB according to various examples.

Turning to FIG. 8, a block diagram 800 is shown that illustrates an eNB 805 configured for wireless communications over a spectrum. In some examples, the eNB 805 may be an example of one or more aspects of one of the devices 705 and/or 755 described with reference to FIGS. 7A and/or 7B, and/or one of the eNBs 105, 205, and/or 605 described with reference to FIGS. 1, 2A, 2B, and/or 6. The eNB 805 may be configured to implement at least some of the features and functions described with reference to FIGS. 1, 2A, 2B, 3, 4, 5, 6, and/or 7. The eNB 805 may include a processor module 810, a memory module 820, at least one transceiver module (represented by transceiver module(s) 855), at least one antenna (represented by antenna(s) 860), and/or an eNB spectrum module 870. The eNB 805 may also include one or both of a base station communications module 830 and a network communications module 840. Each of these components may be in communication with each other, directly or indirectly, over one or more buses 835.

The memory module 820 may include random access memory (RAM) and/or read-only memory (ROM). The memory module 820 may store computer-readable, computer-executable software (SW) code 825 containing instructions that are configured to, when executed, cause the processor module 810 to perform various functions described herein for managing sequences for wireless communications in a spectrum. Alternatively, the software code 825 may not be directly executable by the processor module 810 but be configured to cause the eNB 805, e.g., when compiled and executed, to perform various of the functions described herein.

The processor module 810 may include an intelligent hardware device, e.g., a central processing unit (CPU), a microcontroller, an ASIC, etc. The processor module 810 may process information received through the transceiver module(s) 855, the base station communications module 830, and/or the network communications module 840. The processor module 810 may also process information to be sent to the transceiver module(s) 855 for transmission through the antenna(s) 860, to the base station communications module 830 for transmission to one or more other base stations or eNBs 805-a and 805-b, and/or to the network communications module 840 for transmission to a core network 845, which may be an example of aspects of the core network 130 described with reference to FIG. 1. The processor module 810 may handle, alone or in connection with the eNB spectrum module 870, various aspects of managing transmitted and/or received sequences in a spectrum.

The transceiver module(s) 855 may include a modem configured to modulate packets and provide the modulated packets to the antenna(s) 860 for transmission, and to demodulate packets received from the antenna(s) 860. The transceiver module(s) 855 may in some cases be implemented as one or more transmitter modules and one or more separate receiver modules. In some cases, the transceiver module(s) 855 support communications in a shared spectrum and/or a spectrum that is not shared. The transceiver module(s) 855 may support communications in a spectrum, such as a licensed spectrum (e.g., an LTE spectrum) and/or an unlicensed spectrum (e.g., an LTE-U spectrum). The transceiver module(s) 855 may be configured to communicate bi-directionally, via the antenna(s) 860, with one or more of the UEs or devices 115, 215, 315, 705, and/or 755 described with reference to FIGS. 1, 2A, 2B, 3, 7A, and/or 7B, for example. The eNB 805 may typically include multiple antennas 860 (e.g., an antenna array). The eNB 805 may communicate with the core network 845 through the network communications module 840. The eNB 805 may also communicate with other base stations or eNBs, such as the eNBs 805-a and 805-b, using the base station communications module 830.

According to the architecture of FIG. 8, the eNB 805 may further include a communications management module 850. The communications management module 850 may manage communications with other base stations, eNBs, and/or devices. The communications management module 850 may be in communication with some or all of the other components of the eNB 805 via the bus or buses 835. Alternatively, functionality of the communications management module 850 may be implemented as a component of the transceiver module(s) 855, as a computer program product, and/or as one or more controller elements of the processor module 810.

The eNB spectrum module 870 may be configured to perform and/or control some or all of the features and/or functions described with reference to FIGS. 1, 2A, 2B, 3, 4, 5, 6, 7A, and/or 7B related to wireless communications in a spectrum. For example, the eNB spectrum module 870 may be configured to support wireless communications in a licensed spectrum (e.g., an LTE spectrum) and/or a supplemental downlink mode, a carrier aggregation mode, and/or a standalone mode in an unlicensed spectrum (e.g., an LTE-U spectrum). The eNB spectrum module 870 may include an LTE module 875 configured to handle LTE communications, an LTE unlicensed module 880 configured to handle LTE-U communications, and/or an unlicensed module 885 configured to handle communications other than LTE-U in an unlicensed spectrum. The eNB spectrum module 870 may also include an eNB sequence management module 890 configured to perform, for example, any of the eNB functions described with reference to FIGS. 1, 2, 3, 4, 5, 6, 7A, and/or 7B for managing sequences for wireless communications in a spectrum. The eNB sequence management module 890 may be an example of similar modules (e.g., module 715 and/or 765) described with reference to FIGS. 7A, and/or 7B. The eNB spectrum module 870, or portions of it, may include a processor, and/or some or all of the functionality of the eNB spectrum module 870 may be performed by the processor module 810 and/or in connection with the processor module 810.

Figure 9:
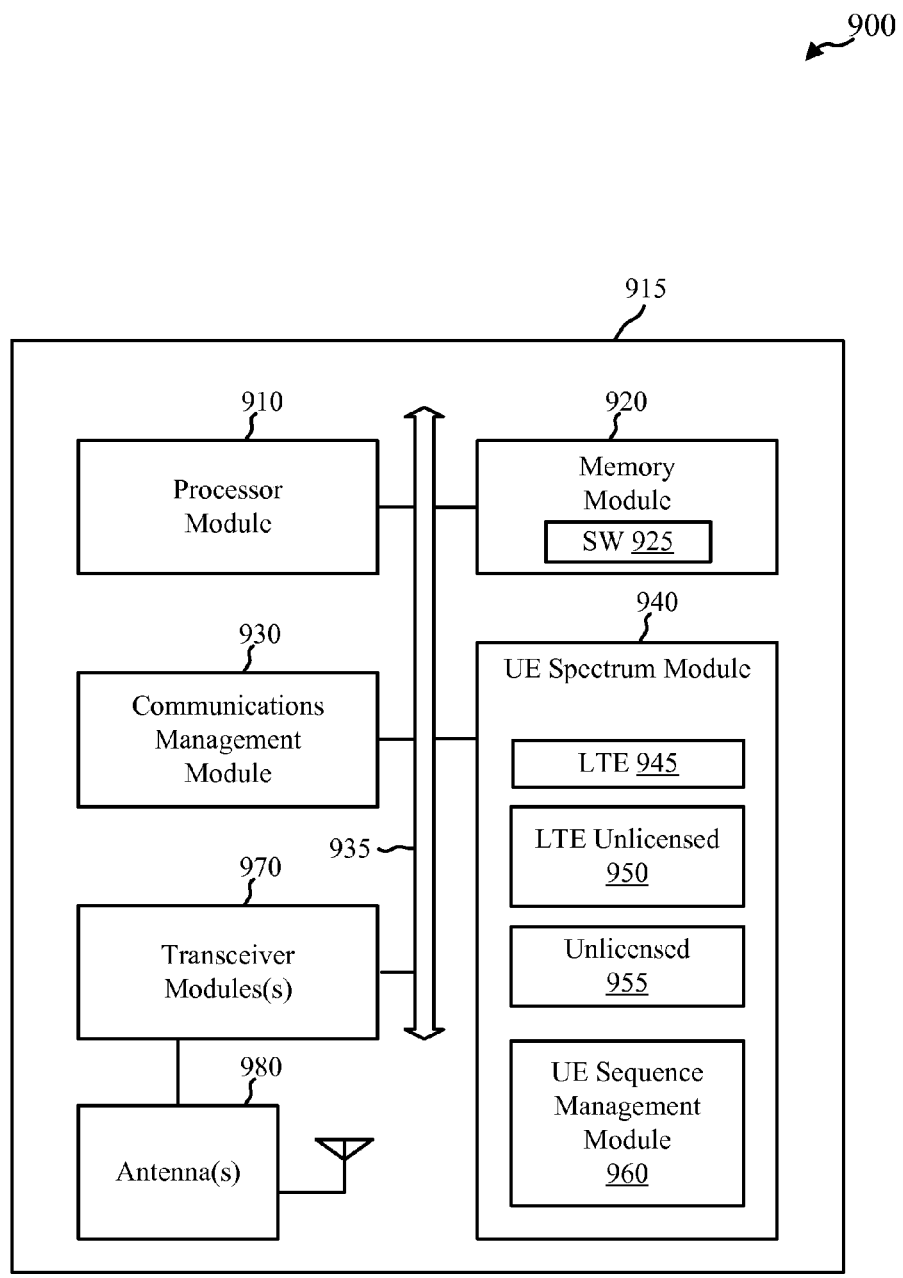
FIG. 9 shows a block diagram of a UE according to various examples.

Turning to FIG. 9, a block diagram 900 is shown that illustrates a UE 915 configured for wireless communications over a spectrum. The UE 915 may have various other configurations and may be included or be part of a personal computer (e.g., a laptop computer, netbook computer, tablet computer, etc.), a cellular telephone, a PDA, a digital video recorder (DVR), an internet appliance, a gaming console, an e-reader, etc. The UE 915 may in some cases have an internal power supply (not shown), such as a small battery, to facilitate mobile operation. In some examples, the UE 915 may be an example of one or more aspects of one of the device 705 and/or 755 described with reference to FIGS. 7A and/or 7B, and/or one of the UEs 115, 215, and/or 315 described with reference to FIGS. 1, 2A, 2B, and/or 3. The UE 915 may be configured to implement at least some of the features and functions described with reference to FIGS. 1, 2A, 2B, 3, 4, 5, 6, 7A, and/or 7B. The UE 915 may also be configured to communicate with one or more of the eNBs or devices 105, 205, 305, 705, 755, and/or 805 described with reference to FIGS. 1, 2A, 2B, 3, 7A, 7B, and/or 8.

The UE 915 may include a processor module 910, a memory module 920, at least one transceiver module (represented by transceiver module(s) 970), at least one antenna (represented by antenna(s) 980), and/or a UE spectrum module 940. Each of these components may be in communication with each other, directly or indirectly, over one or more buses 935.

The memory module 920 may include RAM and/or ROM. The memory module 920 may store computer-readable, computer-executable software (SW) code 925 containing instructions that are configured to, when executed, cause the processor module 910 to perform various functions described herein for managing sequences for wireless communications in a spectrum. In some cases, the executed instructions may cause the processor module 910 to manage sequences similarly to how one of the devices 705 and/or 755 described with reference to FIGS. 7A and/or 7B manages sequences. Alternatively, the software code 925 may not be directly executable by the processor module 910 but be configured to cause the UE 915 (e.g., when compiled and executed) to perform various of the UE functions described herein.

The processor module 910 may include an intelligent hardware device, e.g., a CPU, a microcontroller, an ASIC, etc. The processor module 910 may process information received through the transceiver module(s) 970 and/or information to be sent to the transceiver module(s) 970 for transmission through the antenna(s) 980. The processor module 910 may handle, alone or in connection with the UE spectrum module 940, various aspects of managing transmitted and/or received sequences in a spectrum. In some cases, the processor module 910 may manage sequences similarly to how one of the devices 705 and/or 755 described with reference to FIGS. 7A and/or 7B manages sequences.

The transceiver module(s) 970 may be configured to communicate bi-directionally with eNBs. The transceiver module(s) 970 may be implemented as one or more transmitter modules and one or more separate receiver modules. In some cases, the transceiver module(s) 970 supports communications in a shared spectrum and/or a spectrum that is not shared. The transceiver module(s) 970 may support communications in a spectrum, such as a licensed spectrum (e.g., an LTE spectrum) and/or a unlicensed spectrum (e.g., an LTE-U spectrum). The transceiver module(s) 970 may include a modem configured to modulate packets and provide the modulated packets to the antenna(s) 980 for transmission, and to demodulate packets received from the antenna(s) 980. While the UE 915 may include a single antenna, there may be examples in which the UE 915 may include multiple antennas 980.

According to the architecture of FIG. 9, the UE 915 may further include a communications management module 930. The communications management module 930 may manage communications with various base stations or eNBs. The communications management module 930 may be a component of the UE 915 in communication with some or all of the other components of the UE 915 over the one or more buses 935. Alternatively, functionality of the communications management module 930 may be implemented as a component of the transceiver module(s) 970, as a computer program product, and/or as one or more controller elements of the processor module 910.

The UE spectrum module 940 may be configured to perform and/or control some or all of the features and/or functions described with reference to FIGS. 1, 2A, 2B, 3, 4, 5, 6, 7A, and/or 7B related to wireless communications in a spectrum. For example, the UE spectrum module 940 may be configured to support wireless communications in a licensed spectrum (e.g., an LTE spectrum) and/or a supplemental downlink mode, a carrier aggregation mode, and/or a standalone mode in an unlicensed spectrum (e.g., an LTE-U spectrum). The UE spectrum module 940 may include an LTE module 945 configured to handle LTE communications, an LTE unlicensed module 950 configured to handle LTE-U communications, and/or an unlicensed module 955 configured to handle communications other than LTE-U in an unlicensed spectrum. The UE spectrum module 940 may also include a UE sequence management module 960 configured to perform, for example, sequence management similarly to how one of the devices 705 and/or 755 described with reference to FIGS. 7A and/or 7B performs sequence management. The sequence management module 960 may be an example of similar modules (e.g., module 715 and/or 765) described with reference to FIGS. 7A and/or 7B. The UE spectrum module 940, or portions of it, may include a processor, and/or some or all of the functionality of the UE spectrum module 940 may be performed by the processor module 910 and/or in connection with the processor module 910.

Figure 10:
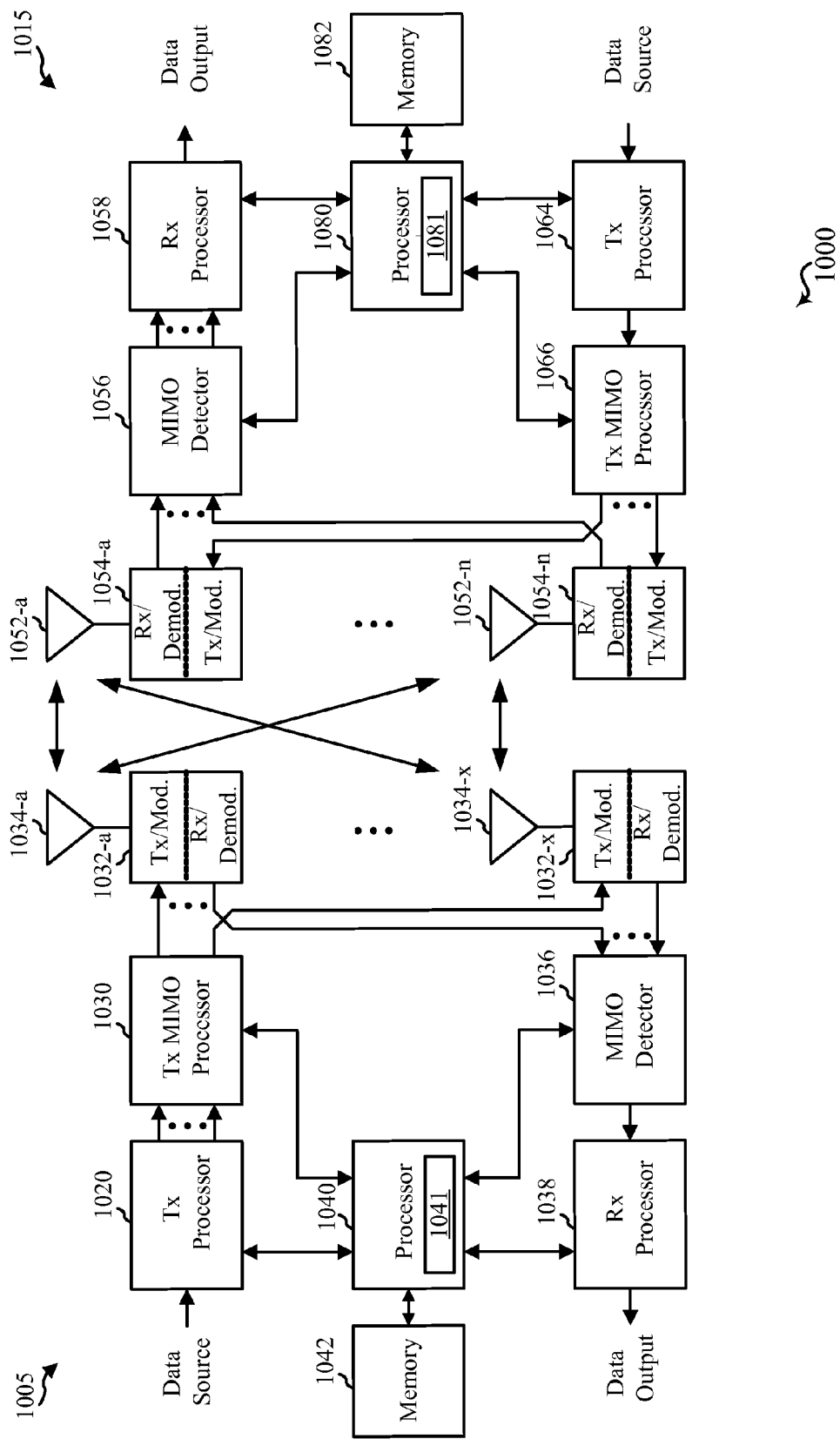
FIG. 10 shows a block diagram that illustrates an example of a multiple-input multiple-output (MIMO) communications system according to various examples.

Turning next to FIG. 10, a block diagram of a multiple-input multiple-output (MIMO) communications system 1000 is shown to include an eNB 1005 and a UE 1015. The eNB 1005 and the UE 1015 may support LTE-based communications using a licensed and/or unlicensed spectrum (e.g., an LTE and/or LTE-U spectrum). The eNB 1005 may be an example of one or more aspects of one of the devices 705 and/or 755 described with reference to FIGS. 7A and/or 7B, and/or one of the eNBs 105, 205, 305, and/or 805 described with reference to FIGS. 1, 2A, 2B, 3, and/or 8. The UE 1015 may be an example of one or more aspects of one of the devices 705 and/or 755 described with reference to FIGS. 7A and/or 7B, and/or one of the UEs 115, 215, 315, and/or 915 described with reference to FIGS. 1, 2A, 2B, 3, and/or 9. The system 1000 may illustrate aspects of the wireless communications system 100, 200, 250, and/or 600 described with reference to FIGS. 1, 2A, 2B, and/or 6.

The eNB 1005 may be equipped with antennas 1034-*a* through 1034-*x*, and the UE 1015 may be equipped with antennas 1052-*a* through 1052-*n*. In the system 1000, the eNB 1005 may be able to send data over multiple communication links at the same time. Each communication link may be called a "layer" and the "rank" of the communication link may indicate the number of layers used for communication. For example, in a 2×2 MIMO system where eNB 1005 transmits two "layers," the rank of the communication link between the eNB 1005 and the UE 1015 may be two.

At the eNB 1005, a transmit (Tx) processor 1020 communicatively coupled with a transmit memory 1042 may receive data from a data source. The transmit processor 1020 may process the data. The transmit processor 1020 may also generate a reference sequence for a number of reference symbols and/or a cell-specific reference signal. A transmit (Tx) MIMO processor 1030 may perform spatial processing (e.g., precoding) on data symbols, control symbols, and/or reference symbols, if applicable, and may provide output symbol streams to the transmit (Tx) modulators 1032-*a* through 1032-*x*. Each modulator 1032 may process a respective output symbol stream (e.g., for OFDM, etc.) to obtain an output sample stream. Each modulator 1032 may further process (e.g., convert to analog, amplify, filter, and upconvert) the output sample stream to obtain a downlink (DL) signal. In one example, DL signals from modulators 1032-*a* through 1032-*x* may be transmitted via the antennas 1034-*a* through 1034-*x*, respectively.

At the UE 1015, the antennas 1052-*a* through 1052-*n* may receive the DL signals from the eNB 1005 and may provide the received signals to the receive (Rx) demodulators 1054-*a* through 1054-*n*, respectively. Each demodulator 1054 may condition (e.g., filter, amplify, downconvert, and digitize) a respective received signal to obtain input samples. Each demodulator 1054 may further process the input samples (e.g., for OFDM, etc.) to obtain received symbols. A MIMO detector 1056 may obtain received symbols from all the demodulators 1054-*a* through 1054-*n*, perform MIMO detection on the received symbols if applicable, and provide detected symbols. A receive (Rx) processor 1058 may process (e.g., demodulate, deinterleave, and decode) the detected symbols, providing decoded data for the UE 1015 to a data output, and provide decoded control information to a processor 1080, or memory 1082.

On the uplink (UL), at the UE 1015, a transmit (Tx) processor 1064 may receive and process data from a data source. The transmit processor 1064 may also generate a reference sequence for a number of reference symbols and/or a reference signal. The symbols from the transmit processor 1064 may be precoded by a transmit (Tx) MIMO processor 1066 if applicable, further processed by the transmit (Tx) modulators 1054-*a* through 1054-*n* (e.g., for SC-FDMA, etc.), and be transmitted to the eNB 1005 in accordance with the transmission parameters received from the eNB 1005. At the eNB 1005, the UL signals from the UE 1015 may be received by the antennas 1034, processed by the receiver (Rx) demodulators 1032, detected by a MIMO detector 1036 if applicable, and further processed by a receive (Rx) processor 1038. The receive processor 1038 may provide decoded data to a data output and to the processor 1040.

The processors 1040 and 1080 may include respective modules or functions 1041 and 1081 for managing sequences for wireless communications in a spectrum. In some examples, the modules or functions 1041, 1081 may be examples of one or more aspects of the sequence management module 715, 765, 890, and/or 960 described with reference to FIGS. 7A, 7B, 8, and/or 9. The eNB 1005 may use the module or function 1041 to manage sequences in conjunction with the transmission or reception of wireless communications to/from the UE 1015 and/or other devices, while the UE 1015 may use the module or function 1081 to manage sequences in conjunction with the transmission or reception of wireless communications to/from the eNB 1005 and/or other devices. In some cases, the eNB 1005 and UE 1015 may only communicate with one another over a spectrum after each of the eNB 1005 and UE 1015 has performed a successful CCA. In some cases, the eNB 1005 and UE 1015 may only communicate with one another over a spectrum after each of the eNB 1005 and UE 1015 has performed a successful CCA for each physical channel to be used by the eNB 1005 and UE 1015 during their communications.

The components of the eNB 1005 may, individually or collectively, be implemented with one or more ASICs adapted to perform some or all of the applicable functions in hardware. Each of the noted modules may be a means for performing one or more functions related to operation of the system 1000. Similarly, the components of the UE 1015 may, individually or collectively, be implemented with one or more ASICs adapted to perform some or all of the applicable functions in hardware. Each of the noted components may be a means for performing one or more functions related to operation of the system 1000.

Figure 11:
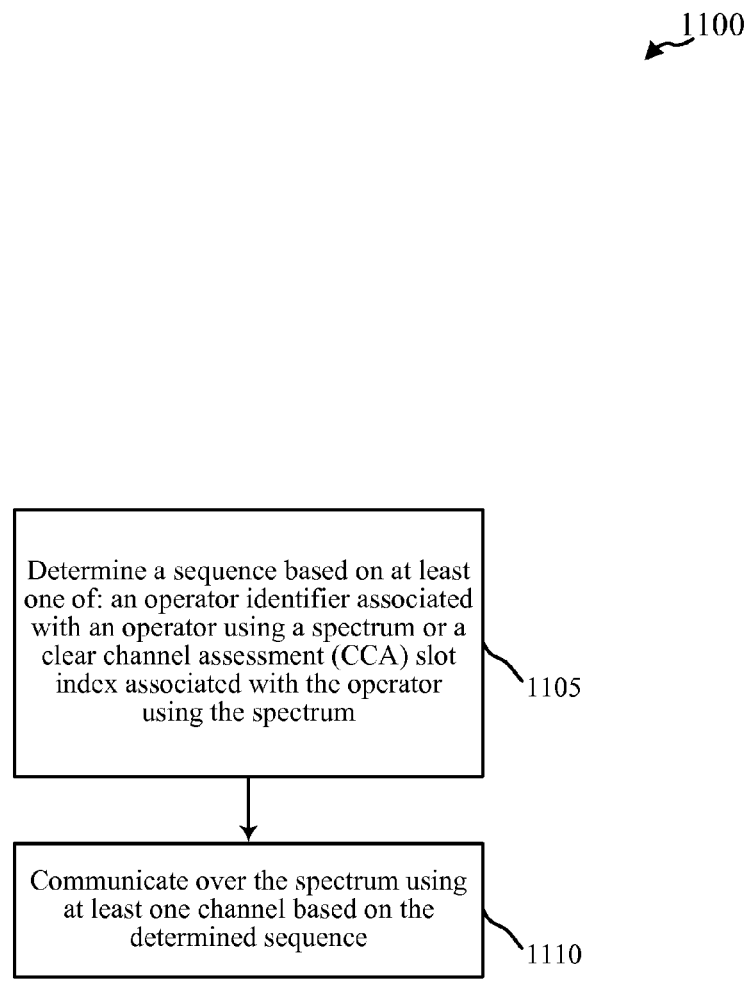
FIG. 11 is a flowchart of an example of a method for wireless communications according to various examples.

FIG. 11 is a flow chart illustrating an example of a method 1100 for wireless communications. For clarity, the method 1100 is described below with reference to one of the devices 335, 705, and/or 755 described with reference to FIGS. 3, 7A, and/or 7B, one of the eNBs 105, 205, 305, 805, and/or 1005 described with reference to FIGS. 1, 2A, 2B, 3, 8, and/or 10, and/or one of the UEs 115, 215, 315, 915, and/or 1015 described with reference to FIGS. 1, 2A, 2B, 3, 9, and/or 10. In one example, a device such as an eNB 105, 205, 305, 805, or 1005 or a UE 115, 215, 315, 915, or 1015 may execute one or more sets of codes to control the functional elements of the device to perform the functions described below.

At block 1105, a sequence may be determined based on at least one of: an operator identifier associated with an operator using a spectrum (e.g., an LTE-U spectrum) or a CCA slot index associated with the operator using the spectrum. The operation(s) at block 1105 may in some cases be performed using the sequence management module 715, 765, 890, 960, 1041, and/or 1081 described with reference to FIGS. 7A, 7B, 8, 9, and/or 10, and/or the sequence determination module 775 described with reference to FIG. 7B.

In some examples, an operator identifier may be determined based on a PLMN identifier of the operator. A first operator may be associated with a first operator identifier for the spectrum; a second operator may be associated with a second operator identifier for the spectrum; and so on. Each of the operator identifiers may be separate (e.g., different) from one another.

In some examples, the CCA slot index associated with the operator using the spectrum may be fixed over time. In other examples, the CCA slot index associated with the operator using the spectrum may vary over time.

In some examples, determining the sequence may include determining an initial value of a sequence generator based on the operator identifier. For example, an initial value of a DM-RS sequence may be determined based on a PLMN identifier, as described with reference to Eq. 2. Or, for example, an initial value of a PUSCH sequence may be determined based on a CCA slot index, as described with reference to Eq. 3.

In some examples, the sequence may be further determined based on at least one of: a cell identifier, or a UE identifier, or a subframe index, or a slot index, or a symbol index, or a codeword index, or a cyclic prefix type index, or a multicast-broadcast single-frequency network (MBSFN) identifier. For example, an SSS sequence may be determined based on both PLMN and PCI, as previously described herein.

At block 1110, at least one channel based on the determined sequence may be used to communicate over the spectrum. The operation(s) at block 1110 may in some cases be performed using the sequence management module 715, 765, 890, 960, 1041, and/or 1081 described with reference to FIGS. 7A, 7B, 8, 9, and/or 10, and/or the communication module 780 described with reference to FIG. 7B.

In some examples (e.g., in the case of a transmitting device), communicating over the spectrum using the at least one channel may include scrambling data of the at least one channel based on the determined sequence or interleaving data of the at least one channel with the determined sequence. In other examples (e.g., in the case of a receiving device), communicating over the spectrum using the at least one channel may include receiving the sequence over the at least one channel.

The at least one channel may include at least one of: a control channel, a data channel, a random access channel, a physical multicast channel, or a synchronization channel.

The method 1100 may be useful in facilitating, for example, early identification of an operator identifier, and/or randomization of sequences for scrambling, interleaving, interference handling, etc.

Thus, the method 1100 may provide for wireless communications. It should be noted that the method 1100 is just one implementation and that the operations of the method 1100 may be rearranged or otherwise modified such that other implementations are possible.

Figure 12:
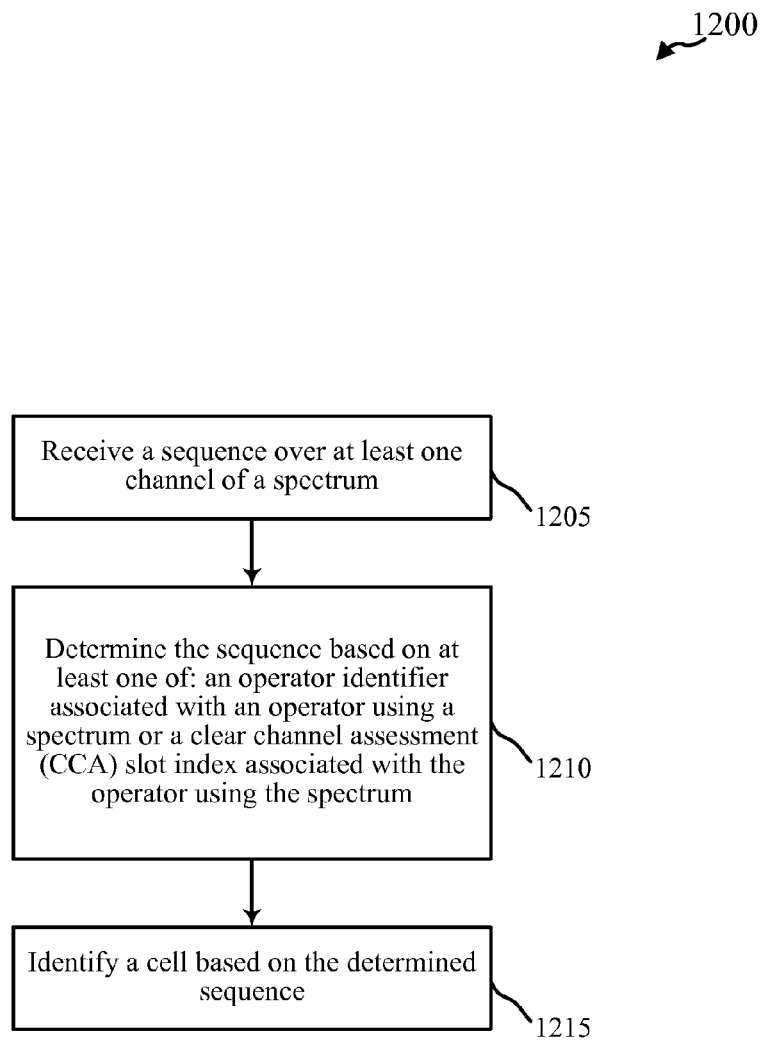
FIG. 12 is a flowchart of an example of a method for wireless communications according to various examples.

FIG. 12 is a flow chart illustrating an example of a method 1200 for wireless communications. For clarity, the method 1200 is described below with reference to one of the devices 335, 705, and/or 755 described with reference to FIGS. 3, 7A, and/or 7B, one of the eNBs 105, 205, 305, 805, and/or 1005 described with reference to FIGS. 1, 2A, 2B, 3, 8, and/or 10, and/or one of the UEs 115, 215, 315, 915, and/or 1015 described with reference to FIGS. 1, 2A, 2B, 3, 9, and/or 10. In one example, a device such as an eNB 105, 205, 305, 805, or 1005 or a UE 115, 215, 315, 915, or 1015 may execute one or more sets of codes to control the functional elements of the device to perform the functions described below.

At block 1205, a sequence may be received over at least one channel of a spectrum (e.g., an LTE-U spectrum). The at least one channel may include at least one of: a control channel, a data channel, a random access channel, a physical multicast channel, or a synchronization channel. The operation(s) at block 1205 may in some cases be performed using the sequence management module 715, 765, 890, 960, 1041, and/or 1081 described with reference to FIGS. 7A, 7B, 8, 9, and/or 10, and/or the communication module 780 described with reference to FIG. 7B.

At block 1210, the sequence may be determined based on at least one of: an operator identifier associated with an operator using the spectrum or a CCA slot index associated with the operator using the spectrum. The operation(s) at block 1210 may in some cases be performed using the sequence management module 715, 765, 890, 960, 1041, and/or 1081 described with reference to FIGS. 7A, 7B, 8, 9, and/or 10, and/or the sequence determination module 775 described with reference to FIG. 7B.

In some examples, the operator identifier may be determined based on a PLMN identifier of the operator. A first operator may be associated with a first operator identifier for the spectrum; a second operator may be associated with a second operator identifier for the spectrum; and so on. Each of the operator identifiers may be separate (e.g., different) from one another.

In some examples, the CCA slot index associated with the operator using the spectrum may be fixed over time. In other examples, the CCA slot index associated with the operator using the spectrum may vary over time.

In some examples, determining the sequence may include determining an initial value of a sequence generator based on the operator identifier. For example, an initial value of a DM-RS sequence may be determined based on a PLMN identifier, as described with reference to Eq. 2. Or, for example, an initial value of a PUSCH sequence may be determined based on a CCA slot index, as described with reference to Eq. 3.

In some examples, the sequence may be further determined based on at least one of: a cell identifier, or a UE identifier, or a subframe index, or a slot index, or a symbol index, or a codeword index, or a cyclic prefix type index, or a multicast-broadcast single-frequency network (MBSFN) identifier. For example, an SSS sequence may be determined based on both PLMN and PCI, as previously described herein.

In some examples (e.g., in the case of a transmitting device), communicating over the spectrum using the at least one channel may include scrambling data of the at least one channel based on the determined sequence or interleaving data of the at least one channel with the determined sequence. In other examples (e.g., in the case of a receiving device), communicating over the spectrum using the at least one channel may include receiving the sequence over the at least one channel.

At block 1215, a cell ID may be identified based on the determined sequence. The operation(s) at block 1215 may in some cases be performed using the sequence management module 715, 765, 890, 960, 1041, and/or 1081 described with reference to FIGS. 7A, 7B, 8, 9, and/or 10.

Thus, the method 1200 may provide for wireless communications. It should be noted that the method 1200 is just one implementation and that the operations of the method 1200 may be rearranged or otherwise modified such that other implementations are possible.

Figure 13:
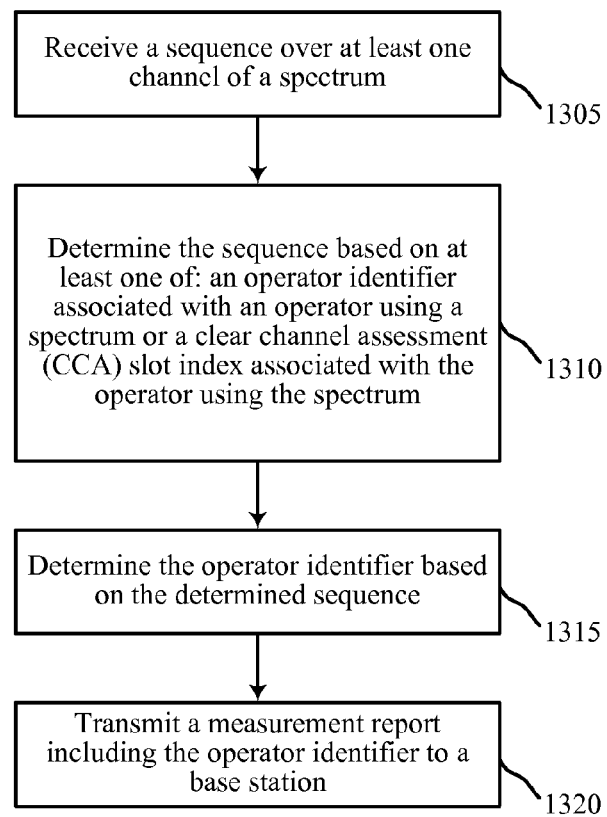
FIG. 13 is a flowchart of an example of a method for wireless communications according to various examples.

FIG. 13 is a flow chart illustrating an example of a method 1300 for wireless communications. For clarity, the method 1300 is described below with reference to one of the devices 335, 705, and/or 755 described with reference to FIGS. 3, 7A, and/or 7B, one of the eNBs 105, 205, 305, 805, and/or 1005 described with reference to FIGS. 1, 2A, 2B, 3, 8, and/or 10, and/or one of the UEs 115, 215, 315, 915, and/or 1015 described with reference to FIGS. 1, 2A, 2B, 3, 9, and/or 10. In one example, a device such as an eNB 105, 205, 305, 805, or 1005 or a UE 115, 215, 315, 915, or 1015 may execute one or more sets of codes to control the functional elements of the device to perform the functions described below.

At block 1305, a sequence may be received over at least one channel of a spectrum (e.g., an LTE-U spectrum). The at least one channel may include at least one of: a control channel, a data channel, a random access channel, a physical multicast channel, or a synchronization channel. The operation(s) at block 1305 may in some cases be performed using the sequence management module 715, 765, 890, 960, 1041, and/or 1081 described with reference to FIGS. 7A, 7B, 8, 9, and/or 10, and/or the communication module 780 described with reference to FIG. 7B.

At block 1310, the sequence may be determined based on at least one of: an operator identifier associated with an operator using the spectrum or a CCA slot index associated with the operator using the spectrum. The operation(s) at block 1310 may in some cases be performed using the sequence management module 715, 765, 890, 960, 1041, and/or 1081 described with reference to FIGS. 7A, 7B, 8, 9, and/or 10, and/or the sequence determination module 775 described with reference to FIG. 7B.

At block 1315, the operator identifier associated with the operator using the spectrum may be determined based on the determined sequence. In some examples, the operator identifier may be determined based on a PLMN identifier of the operator. A first operator may be associated with a first operator identifier for the spectrum; a second operator may be associated with a second operator identifier for the spectrum; and so on. Each of the operator identifiers may be separate (e.g., different) from one another.

In some cases, the sequence received at block 1305 may be received in connection with a synchronization signal, and the operator identifier may be determined prior to decoding a master information block received from a base station associated with the operator.

In some examples, the CCA slot index associated with the operator using the spectrum may be fixed over time. In other examples, the CCA slot index associated with the operator using the spectrum may vary over time.

In some examples, determining the sequence may include determining an initial value of a sequence generator based on the operator identifier. For example, an initial value of a DM-RS sequence may be determined based on a PLMN identifier, as described with reference to Eq. 2. Or, for example, an initial value of a PUSCH sequence may be determined based on a CCA slot index, as described with reference to Eq. 3.

In some examples, the sequence may be further determined based on at least one of: a cell identifier, or a UE identifier, or a subframe index, or a slot index, or a symbol index, or a codeword index, or a cyclic prefix type index, or a multicast-broadcast single-frequency network (MBSFN) identifier. For example, an SSS sequence may be determined based on both PLMN and PCI, as previously described herein.

Optionally, and at block 1320, a measurement report including the operator identifier may be transmitted to a base station. The measurement report may also include other information, such as a cell ID and/or channel quality information. The channel quality information may be in the form of reference signal received power (RSRP), reference signal received quality (RSRQ), Received Signal Strength Indicator (RSSI), packet error rate associated with one or more channels, interference levels, interference over thermal, and/or other types of channel quality information.

The method 1300 may be useful in facilitating, for example, early identification of an operator identifier.

Thus, the method 1300 may provide for wireless communications. It should be noted that the method 1300 is just one implementation and that the operations of the method 1300 may be rearranged or otherwise modified such that other implementations are possible.

Figure 14:
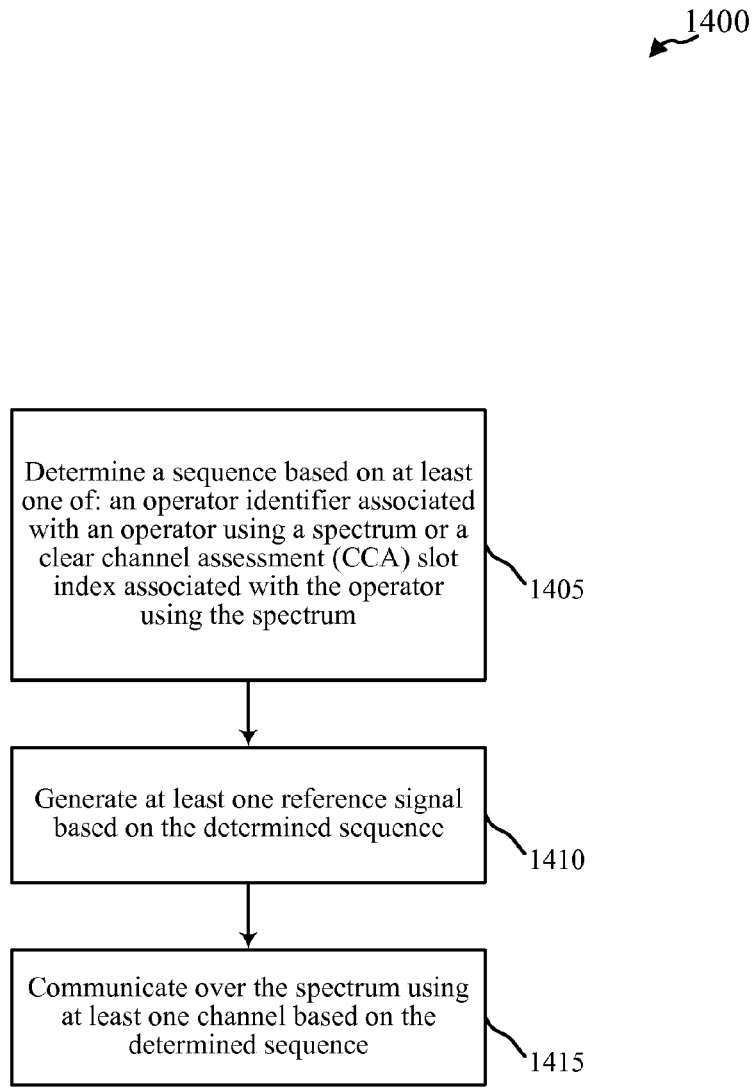
FIG. 14 is a flowchart of an example of a method for wireless communications according to various examples.

FIG. 14 is a flow chart illustrating an example of a method 1400 for wireless communications. For clarity, the method 1400 is described below with reference to one of the devices 335, 705, and/or 755 described with reference to FIGS. 3, 7A, and/or 7B, one of the eNBs 105, 205, 305, 805, and/or 1005 described with reference to FIGS. 1, 2A, 2B, 3, 8, and/or 10, and/or one of the UEs 115, 215, 315, 915, and/or 1015 described with reference to FIGS. 1, 2A, 2B, 3, 9, and/or 10. In one example, a device such as an eNB 105, 205, 305, 805, or 1005 or a UE 115, 215, 315, 915, or 1015 may execute one or more sets of codes to control the functional elements of the device to perform the functions described below.

At block 1405, a reference sequence may be determined based on at least one of: an operator identifier associated with an operator using a spectrum (e.g., an LTE-U spectrum) or a CCA slot index associated with the operator using the spectrum. The operation(s) at block 1405 may in some cases be performed using the sequence management module 715, 765, 890, 960, 1041, and/or 1081 described with reference to FIGS. 7A, 7B, 8, 9, and/or 10, and/or the sequence determination module 775 described with reference to FIG. 7B.

In some examples, the operator identifier may be determined based on a PLMN identifier of the operator. A first operator may be associated with a first operator identifier for the spectrum; a second operator may be associated with a second operator identifier for the spectrum; and so on. Each of the operator identifiers may be separate (e.g., different) from one another.

In some examples, the CCA slot index associated with the operator using the spectrum may be fixed over time. In other examples, the CCA slot index associated with the operator using the spectrum may vary over time.

In some examples, determining the reference sequence may include determining an initial value of a sequence generator based on the operator identifier.

In some examples, the sequence may be further determined based on at least one of: a cell identifier, or a UE identifier, or a subframe index, or a slot index, or a symbol index, or a codeword index, or a cyclic prefix type index, or a multicast-broadcast single-frequency network (MBSFN) identifier. For example, an SSS sequence may be determined based on both PLMN and PCI, as previously described herein.

At block 1410, at least one reference signal may be generated based on the determined sequence. The at least one reference signal may include at least one of a sounding reference signal, a demodulation reference signal, a common reference signal, a channel-state information signal, a positioning reference signal, or a multicast-broadcast single-frequency network (MBSFN) reference signal. The operation(s) at block 1410 may in some cases be performed using the sequence management module 715, 765, 890, 960, 1041, and/or 1081 described with reference to FIGS. 7A, 7B, 8, 9, and/or 10.

At block 1415, at least one channel based on the determined sequence may be used to communicate over the spectrum. The communication may include transmitting the at least one reference signal. The operation(s) at block 1415 may in some cases be performed using the sequence management module 715, 765, 890, 960, 1041, and/or 1081 described with reference to FIGS. 7A, 7B, 8, 9, and/or 10, and/or the communication module 780 described with reference to FIG. 7B.

The at least one channel may include at least one of: a control channel, a data channel, a random access channel, a physical multicast channel, or a synchronization channel.

The method 1400 may be useful in facilitating, for example, early identification of an operator identifier, and/or randomization of sequences for scrambling, interleaving, interference handling, etc.

Thus, the method 1400 may provide for wireless communications. It should be noted that the method 1400 is just one implementation and that the operations of the method 1400 may be rearranged or otherwise modified such that other implementations are possible.

Figure 15:
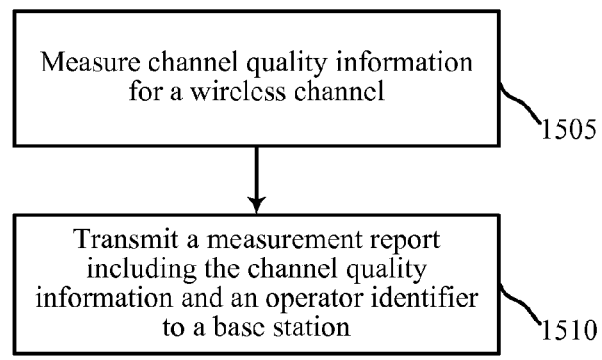
FIG. 15 is a flowchart of an example of a method for wireless communications according to various examples.

FIG. 15 is a flow chart illustrating an example of a method 1500 for wireless communications. For clarity, the method 1500 is described below with reference to one of the devices 335, 705, and/or 755 described with reference to FIGS. 3, 7A, and/or 7B, one of the eNBs 105, 205, 305, 805, and/or 1005 described with reference to FIGS. 1, 2A, 2B, 3, 8, and/or 10, and/or one of the UEs 115, 215, 315, 915, and/or 1015 described with reference to FIGS. 1, 2A, 2B, 3, 9, and/or 10. In one example, a device such as an eNB 105, 205, 305, 805, or 1005 or a UE 115, 215, 315, 915, or 1015 may execute one or more sets of codes to control the functional elements of the device to perform the functions described below.

At block 1505, channel quality information for a wireless channel may be measured. In some cases, channel quality information includes a reference signal received power (RSRP), a reference signal received quality (RSRQ), a received signal strength indicator (RSSI), a packet error rate associated with one or more channels, an interference level, and/or an interference over thermal. The operation(s) at block 1505 may in some cases be performed using the sequence management module 715, 765, 890, 960, 1041, and/or 1081 described with reference to FIGS. 7A, 7B, 8, 9, and/or 10, and/or the communication module 780 described with reference to FIG. 7B.

At block 1510, a measurement report including the channel quality information and an operator identifier may be transmitted to a base station. In some cases, the operator identifier includes a public land mobile network (PLMN) identifier. The measurement report may include a cell identifier. The operation(s) at block 1510 may in some cases be performed using the sequence management module 715, 765, 890, 960, 1041, and/or 1081 described with reference to FIGS. 7A, 7B, 8, 9, and/or 10, the communication module 780 described with reference to FIGS. 7B, and/or the transmitter module 720, 770, 855, 970, and/or 1032 described with reference to FIGS. 7A, 7B, 8, 9, and/or 10.

Thus, the method 1500 may provide for wireless communications. It should be noted that the method 1500 is just one implementation and that the operations of the method 1500 may be rearranged or otherwise modified such that other implementations are possible.

The detailed description set forth above in connection with the appended drawings describes exemplary examples and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication, the method comprising:
   determining, at a user equipment (UE), a sequence value based on at least one of: an operator identifier associated with an operator using a spectrum or a clear channel assessment (CCA) slot index associated with the operator using the spectrum; and
   communicating, by the UE, over the spectrum using at least one channel based on the determined sequence value, wherein communicating over the spectrum using the at least one channel comprises at least one of: scrambling data of the at least one channel based on the determined sequence value or interleaving data of the at least one channel with the determined sequence value.

2. The method of claim 1, wherein the spectrum is a shared spectrum.

3. The method of claim 1, wherein communicating over the spectrum using the at least one channel comprises receiving the sequence value over the at least one channel, the method further comprising:
   identifying a cell based on the determined sequence value.

4. The method of claim 1, wherein communicating over the spectrum using the at least one channel comprises receiving the sequence value over the at least one channel, the method further comprising
   determining the operator identifier based on the determined sequence value.

5. The method of claim 4, wherein the sequence value is received in connection with a synchronization signal, and the operator identifier is determined prior to decoding a master information block received from a base station associated with the operator.

6. The method of claim 1, wherein determining the sequence value comprises:
   determining an initial value of a sequence generator based on the operator identifier.

7. The method of claim 1, wherein the sequence value comprises a reference sequence and the at least one channel comprises at least one of: a control channel, a data channel, a random access channel, a physical multicast channel, or a synchronization channel.

8. The method of claim 7, further comprising:
generating at least one reference signal based on the determined sequence value, wherein the at least one reference signal comprises at least one of a sounding reference signal, a demodulation reference signal, a common reference signal, a channel-state information signal, a positioning reference signal, or a multicast-broadcast single-frequency network (MBSFN) reference signal.

9. The method of claim 1, wherein the sequence value is further determined based on at least one of: a cell identifier, or a user equipment (UE) identifier, or a subframe index, or a slot index, or a symbol index, or a codeword index, or a cyclic prefix type index, or a multicast-broadcast single-frequency network (MBSFN) identifier.

10. The method of claim 1, wherein the operator identifier is determined based on at least one of a public land mobile network (PLMN) identifier of the operator or a service identifier of the operator.

11. The method of claim 1, wherein a first operator is associated with a first operator identifier for the spectrum that is separate from a second operator identifier associated with a second operator for the spectrum.

12. The method of claim 1 further comprising:
measuring channel quality information for a wireless channel of the at least one channels; and
transmitting a measurement report comprising the channel quality information and the operator identifier to a base station.

13. The method of claim 12, wherein the operator identifier comprises a public land mobile network (PLMN) identifier.

14. The method of claim 12, wherein the measurement report further comprises a cell identifier.

15. An apparatus for wireless communications, the wireless apparatus comprising:
a memory storing instructions and a processor coupled to said memory wherein upon execution of the instructions the processor is configured to:
determine a sequence value based on at least one of: an operator identifier associated with an operator using a spectrum or a clear channel assessment (CCA) slot index associated with the operator using the spectrum; and
communicate over the spectrum using at least one channel based on the determined sequence value, wherein communicating over the spectrum using the at least one channel comprises at least one of: scrambling data of the at least one channel based on the determined sequence value or interleaving data of the at least one channel with the determined sequence value.

16. The apparatus of claim 15, wherein the spectrum is a shared spectrum.

17. The apparatus of claim 15, wherein the processor configured to communicate over the spectrum using the at least one channel comprises the processor configured to, upon execution of the instructions, receive the sequence value over the at least one channel;
wherein the processor is further configured to, upon execution of the instructions, identify a cell based on the determined sequence value.

18. The apparatus of claim 15, wherein the processor configured to communicate over the spectrum using the at least one channel comprises the processor configured to, upon execution of the instructions, receive the sequence value over the at least one channel;
wherein the processor is further configured to, upon execution of the instructions,
determine the operator identifier based on the determined sequence value.

19. The apparatus of claim 18, wherein the sequence value is received in connection with a synchronization signal, and the operator identifier is determined prior to decoding a master information block received from a base station associated with the operator.

20. The apparatus of claim 15, wherein the processor configured to determine the sequence value comprises the processor configured to, upon execution of the instructions, determine an initial value of a sequence generator based on the operator identifier.

21. The apparatus of claim 15, wherein the sequence value comprises a reference sequence and the at least one channel comprises at least one of: a control channel, a data channel, a random access channel, a physical multicast channel, or a synchronization channel.

22. The apparatus of claim 21, wherein, upon execution of the instructions, the processor is further configured to:
generate at least one reference signal based on the determined sequence value, wherein the at least one reference signal comprises at least one of a sounding reference signal, a demodulation reference signal, a common reference signal, a channel-state information signal, a positioning reference signal, or a multicast-broadcast single-frequency network (MBSFN) reference signal.

23. The apparatus of claim 15, wherein the sequence value is further determined based on at least one of: a cell identifier, or a user equipment (UE) identifier, or a subframe index, or a slot index, or a symbol index, or a codeword index, or a cyclic prefix type index, or a multicast-broadcast single-frequency network (MBSFN) identifier.

24. The apparatus of claim 15, wherein the operator identifier is determined based on at least one of a public land mobile network (PLMN) identifier of the operator or a service identifier of the operator.

25. The apparatus of claim 15, wherein a first operator is associated with a first operator identifier for the spectrum that is separate from a second operator identifier associated with a second operator for the spectrum.

26. The apparatus of claim 15,
wherein upon execution of the instructions the processor further configured to:
measure channel quality information for a wireless channel of the at least one channels; and
transmit a measurement report comprising the channel quality information and the operator identifier to a base station.

27. The apparatus of claim 26, wherein the operator identifier comprises a public land mobile network (PLMN) identifier.

28. The apparatus of claim 26, wherein the measurement report further comprises a cell identifier.

* * * * *